United States Patent
Johnson et al.

(10) Patent No.: US 10,706,311 B2
(45) Date of Patent: Jul. 7, 2020

(54) INCREASING DISSIMILARITY OF CHARACTERS DISPOSED ON AN OPTICALLY ACTIVE ARTICLE

(71) Applicant: 3M INNOVATIVE PROPERTIES COMPANY, St. Paul, MN (US)

(72) Inventors: Justin M. Johnson, Hudson, WI (US); James W. Howard, Circle Pines, MN (US); Thomas J. Dahlin, Ironwood, MI (US); James B. Snyder, Minneapolis, MN (US); James L. C. Werness, Jr., Edina, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 249 days.

(21) Appl. No.: 15/754,138

(22) PCT Filed: Aug. 19, 2016

(86) PCT No.: PCT/US2016/047745
§ 371 (c)(1),
(2) Date: Feb. 21, 2018

(87) PCT Pub. No.: WO2017/034968
PCT Pub. Date: Mar. 2, 2017

(65) Prior Publication Data
US 2018/0239981 A1 Aug. 23, 2018

Related U.S. Application Data

(60) Provisional application No. 62/316,827, filed on Aug. 19, 2016, provisional application No. 62/207,986, filed on Aug. 21, 2015.

(51) Int. Cl.
*G06K 9/00* (2006.01)
*G06K 9/18* (2006.01)
(Continued)

(52) U.S. Cl.
CPC ........... *G06K 9/18* (2013.01); *G06K 9/00442* (2013.01); *G06K 9/2018* (2013.01); *G06K 9/62* (2013.01);
(Continued)

(58) Field of Classification Search
CPC ........ G06K 9/18; G06K 9/00442; G06K 9/62; G06K 9/2018
See application file for complete search history.

(56) References Cited

U.S. PATENT DOCUMENTS 6,832,728 B2   12/2004 Kennedy
7,387,393 B2   6/2008 Reich
(Continued)

FOREIGN PATENT DOCUMENTS

CN      107011760       8/2017
WO   WO 2011-044149    4/2011
(Continued)

OTHER PUBLICATIONS

Andreev, "Word Image Matching Based on Hausdorff Distances," 10th International Conference on Document Analysis and Recognition, 2009, pp. 396-400.
(Continued)

*Primary Examiner* — Gregory M Desire
(74) *Attorney, Agent, or Firm* — Michael Stern

(57) ABSTRACT

The inventors of the present application developed novel retroreflective materials, and articles. One example of the present application is a retroreflective article, comprising a substrate and a machine-readable information disposed on the substrate, wherein the machine-readable information corresponds to a predetermined human-readable information.

17 Claims, 8 Drawing Sheets

(51) Int. Cl.
*G06K 9/20* (2006.01)
*G06K 9/62* (2006.01)

(52) U.S. Cl.
CPC ..... *G06K 2209/01* (2013.01); *G06K 2209/15* (2013.01)

(56) References Cited

U.S. PATENT DOCUMENTS

| | | | |
|---|---|---|---|
| 8,194,914 B1 | 6/2012 | Skogg et al. | |
| 8,704,889 B2* | 4/2014 | Hofman | G06K 9/209 348/143 |
| 8,865,293 B2 | 10/2014 | Smithson | |
| 9,002,066 B2* | 4/2015 | Kozitsky | G06K 9/2018 340/933 |
| 9,145,098 B2 | 9/2015 | Fleming | |
| 9,177,211 B2* | 11/2015 | Lehning | G06K 9/00785 |
| 9,384,423 B2* | 7/2016 | Rodriguez-Serrano | G06K 9/72 |
| 9,471,863 B2 | 10/2016 | Fleming | |
| 9,483,677 B2* | 11/2016 | Rowe | G06K 7/1404 |
| 10,019,640 B2* | 7/2018 | Almeida | G07C 9/00007 |
| 10,296,794 B2* | 5/2019 | Ratti | G06K 9/3233 |
| 10,482,361 B2* | 11/2019 | Yanson | G06K 19/06037 |
| 2010/0151213 A1 | 6/2010 | Smithson | |
| 2010/0164219 A1 | 7/2010 | Jeacock et al. | |
| 2011/0084126 A1 | 4/2011 | Fleming | |
| 2015/0060551 A1 | 3/2015 | Fleming et al. | |
| 2018/0239981 A1* | 8/2018 | Johnson | G06K 9/18 |

FOREIGN PATENT DOCUMENTS

| | | |
|---|---|---|
| WO | WO 2013-149142 | 10/2013 |
| WO | WO 2015-148426 | 10/2015 |

OTHER PUBLICATIONS

Mun, "Making Democracy Legible: A Defiant Typeface," Jun. 2013 [retrieved from the internet on Apr. 23, 2018], URL <https://walkerart.org/magazine/sang-mun-defiant-typeface-nsa-privacy>, 13 pages.

Perez-Cortes, "Fast and Accurate Handwritten Character Recognition Using Approximate Nearest Neighbours Search on Large Databases," Advances in Pattern Recognition, Joint IAPR International Workshops on Statistical Techniques in Pattern Recognition (SPR) and Structural and Syntactic Pattern Recognition (SSPR), Dec. 2000, pp. 767-776.

Singh, "Feature Extraction and Classification Techniques in OCR Systems for Handwritten Gurmukhi Script—A Survey," International Journal of Engineering Research and Applications (IJERA), 2011, vol. 1, No. 4, pp. 1736-1739.

Yamamiya, "Using Infrared-Transparent Pigments to Identify Objects," System and Computers in Japan, 2002, vol. 33, No. 10, pp. 74-82.

International Search Report for PCT International Application No. PCT/US2016/047745, dated Jan. 10, 2017, 8 pages.

* cited by examiner

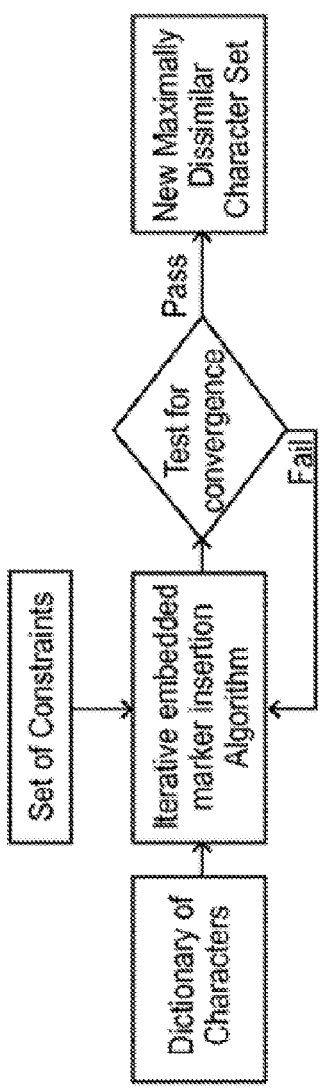
FIG. 10
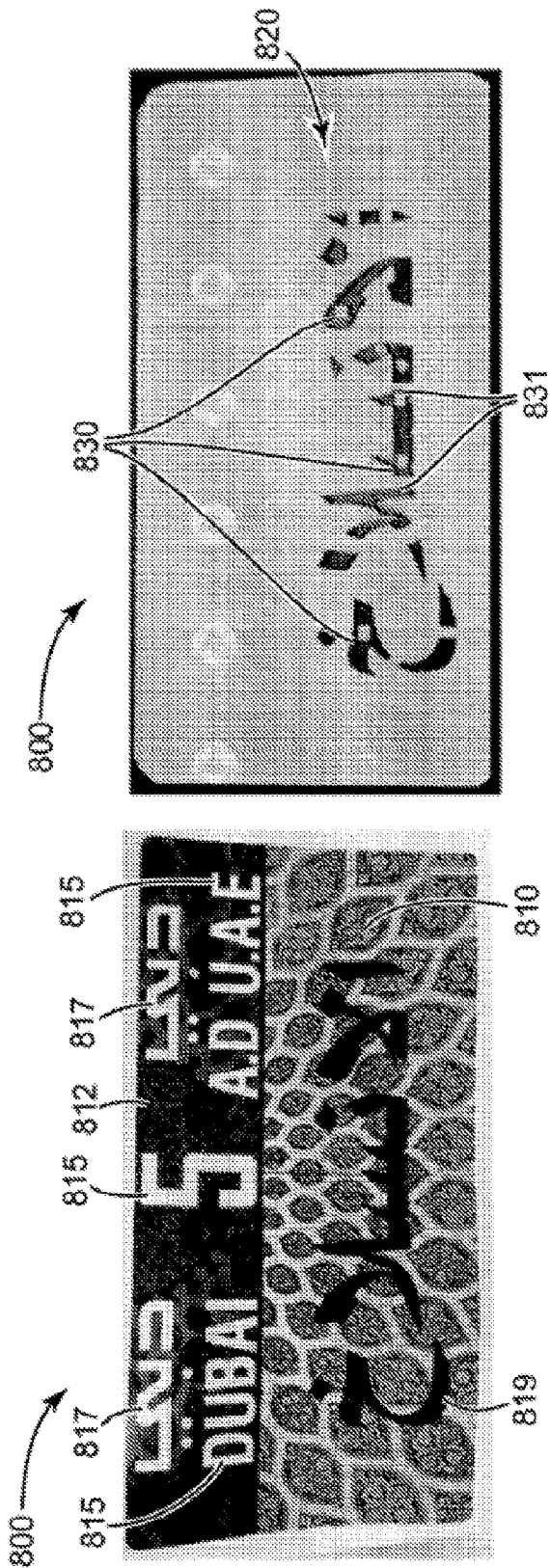
FIG. 11A
FIG. 11B

INCREASING DISSIMILARITY OF CHARACTERS DISPOSED ON AN OPTICALLY ACTIVE ARTICLE

CROSS REFERENCE TO RELATED APPLICATIONS

This application is a national stage filing under 35 U.S.C. 371 of PCT/US2016/047745, filed Aug. 19, 2016, which claims the benefit of Provisional Application Nos. 62/207,986, filed Aug. 21, 2015 and 62/316,827, filed Apr. 1, 2016, the disclosure of which is incorporated by reference in its/their entirety herein.

TECHNICAL FIELD

The present application relates generally to novel retroreflective articles and systems in which the articles may be used.

BACKGROUND

Automatic Vehicle Recognition (AVR) or Automated License Plate Recognition (ALPR) may refer to the detection and recognition of a vehicle by an electronic system. Exemplary uses for AVR or ALPR include, for example, automatic tolling (e.g., electronic toll systems), traffic law enforcement (e.g., red light running systems, speed enforcement systems), searching for vehicles associated with crimes, access control systems, and facility access control. AVR systems in use today may include systems using RFID technology to read an RFID tag attached to a vehicle. ALPR systems may use cameras to capture images of license plates.

Some AVR systems use RFID, although not all vehicles may include RFID tags. Furthermore, some tag readers may have difficulty pinpointing the exact location of an unpowered RFID tag. As such, these tag readers may only detect the presence or absence of a tag in their field of sensitivity, rather than information included in the RFID tags. Some RFID tag readers may only operate at short range, function poorly in the presence of metal, and/or may be blocked by interference when many tagged objects are present.

ALPR systems use an image capture device to read information of a vehicle, such as a license plate number or other visual content of the license plate. In some instances, the information is attached to, printed on, or adjacent to a license plate. ALPR systems may be used in many environments, since almost all areas of the world require that vehicles have license plates with visually identifiable information thereon. However, image capture and recognition of license plate information for a vehicle may be complex. For example, the read accuracy from an ALPR system may be dependent on the quality of the captured image as assessed by the reader.

BRIEF DESCRIPTION OF DRAWINGS

FIG. 10 is a flow diagram illustrating an exemplary method according to the present application.

FIG. 11A depicts an exemplary embodiment of a retroreflective article according to the present application viewed under diffuse visible light.

FIG. 11B depicts the retroreflective article shown in FIG. 11A viewed under infrared radiation.

DETAILED DESCRIPTION

Techniques of the disclosure are directed to increasing the dissimilarity of characters disposed on an optically active article. For instance, the techniques may include disposing one or more encoding region at or within locations of a character to increase the dissimilarity of the appearance of the character with respect to other characters in a character set. Rather than arbitrarily placing the encoding regions at certain locations of a character to increase dissimilarity, the techniques deterministically evaluate one or more locations of a character and select a location that increases the degree of dissimilarity of the character with respect to other characters to a satisfy a dissimilarity threshold. In this way, techniques of this disclosure may improve the dissimilarity of characters beyond arbitrary placement of markers at or within a character.

Figure 1:
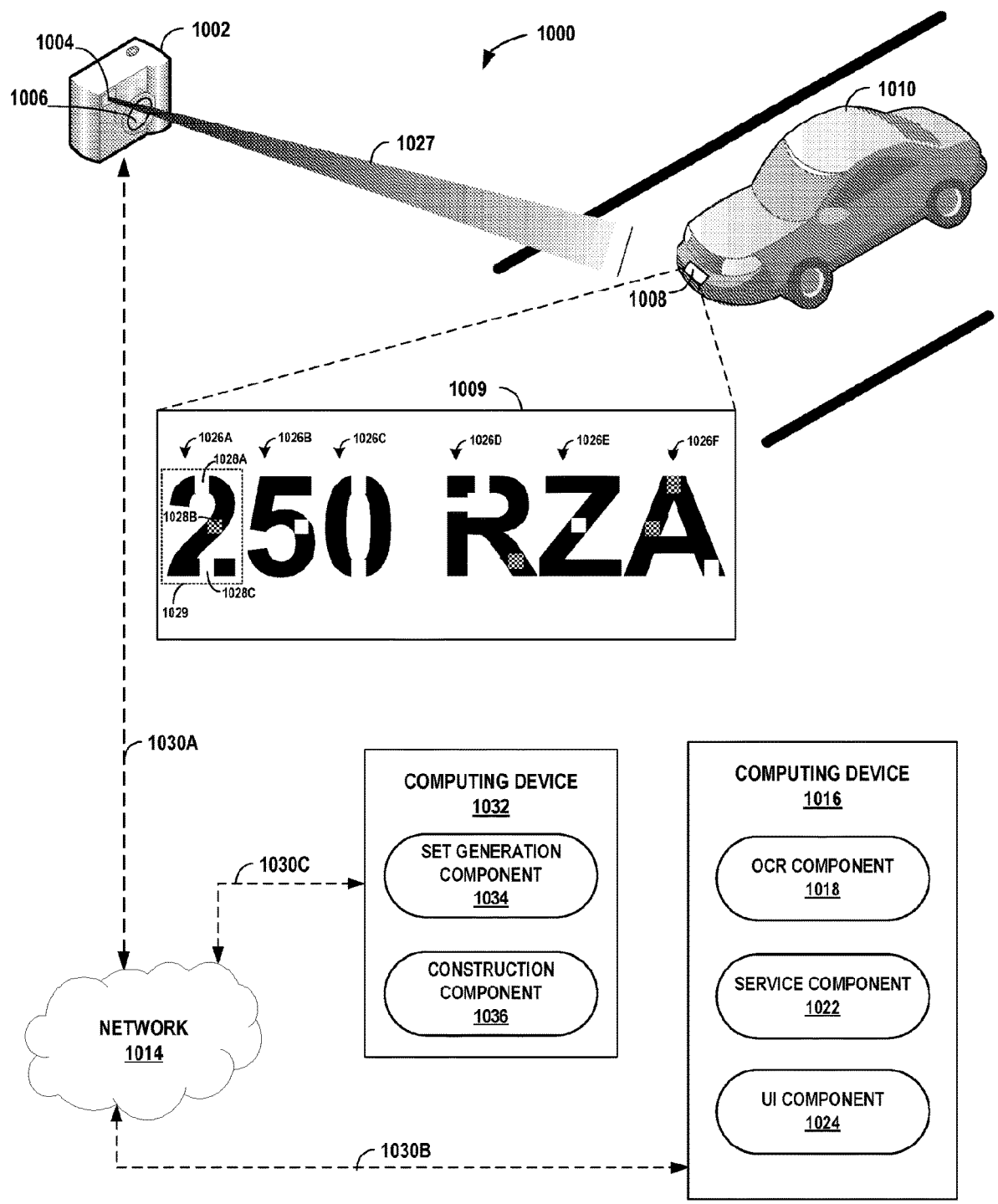
FIG. 1 is a block diagram illustrating an example system 1000 for decoding information included in encoding regions of an optically active article in accordance with techniques of this disclosure.

FIG. 1 is a block diagram illustrating an example system 1000 for including symbols on optically active article in accordance with techniques of this disclosure. As shown in FIG. 1, system 1000 includes an image capture device 1002. Image capture device 1002 may include one or more image capture sensors 1006 and one or more light sources 1004. System 1010 may also include one or more optically active articles as described in this disclosure, such as license plate 1008. License plate 1008 may be attached or otherwise associated with vehicle 1010. In some examples, image capture device 1002 is communicatively coupled to computing device 1002 via network 1002 using one or more communication links. In other examples, as described in this disclosure, image capture device 1002 may be communicatively coupled to computing device 1002 via one or more forms of direct communication without network 1002, such as via a wired or wireless connection that does not require a network.

For example purposes in FIG. 1, optically active article 1008 is illustrated as a license plate as attached to vehicle

1010. Vehicle 1010 may be an automobile, motorcycle, airplane, water vessel, military equipment, bicycle, train, or any other transportation vehicle. In other examples, optically active article 1008 may be attached to, included or embedded in, or otherwise integrated or associated with objects including, but not limited to: a document, clothing, wearable equipment, a building, stationary equipment, or any other object. In some examples, optically active article 1008 may not be a separate object attached to vehicle 1010 but rather printed on vehicle 1010 or other suitable object.

Optically active article 1008 may include reflective, non-reflective, and/or retroreflective sheeting applied to a base surface. In some examples, an optically active article may be a retroreflective article. Information, such as but not limited to characters, images, and/or any other graphical content, may be printed, formed, or otherwise embodied on the retroreflective sheeting. The reflective, non-reflective, and/or retroreflective sheeting may be applied to the base surface using one or more techniques and/or materials including but not limited to: mechanical bonding, thermal bonding, chemical bonding, or any other suitable technique for attaching retroreflective sheeting to a base surface. A base surface may include any surface of an object (such as described above, e.g., an aluminum plate) to which the reflective, non-reflective, and/or retroreflective sheeting may be attached. Information may be printed, formed, or otherwise embodied on the sheeting using any one or more of an ink, a dye, a thermal transfer ribbon, a colorant, a pigment, and/or an adhesive coated film. In some examples, information is formed from or includes a multi-layer optical film, a material including an optically active pigment or dye, or an optically active pigment or dye.

In the example of FIG. 1, optically active article 1008 (e.g., a license place) includes printed information 1026A-1026F ("information 1026"). In FIG. 1, each instance of information 1026 is a symbol from a symbol set. The symbol set may be an alphabet, number set, and/or any other set of glyphs. In FIG. 1, the symbol set includes at least the letters of English alphabet and Arabic numerals.

In the example of FIG. 1, each symbol includes one or more encoding regions 1028A-1028C. An encoding region may be a location, region, or area of optically active article 1008 that may be selectively printed, in accordance with techniques of this disclosure, with either (1) visibly-opaque, infrared-transparent cyan, magenta and yellow (CMY) inks or (2) visibly-opaque, infrared-opaque inks (e.g., inks containing carbon black). In some examples, an encoding region is embedded within an instance of printed information, such embedded data unit 1028A being included within the boundary of printed information 1026A (e.g., Arabic numeral '2'). A boundary or perimeter of a symbol may be an interface between a first set of pixel values that represent the symbol and a second set of pixel values that represent space (e.g., whitespace) surrounding or within the representation of the symbol. In some examples, a boundary or perimeter of a symbol may have more than one interface, such as an 'A' which includes an interior interface (e.g., the center whitespace within the 'A' glyph) and an exterior interface (e.g., the whitespace surrounding the 'A' glyph). In some examples, an encoding region may be "active" or "inactive". In the example of FIG. 1, an encoding region (e.g., 1028A), which is printed with visibly-opaque, infrared-transparent ink, and that reflects light above a threshold light intensity is active, while an encoding region (e.g., 1028B), which is printed with visibly-opaque, infrared-opaque ink, and that does not reflect light above the threshold light intensity is inactive. In an alternative example, an encoding region, which is printed with visibly-opaque, infrared-transparent ink, and that reflects light above a threshold light intensity is inactive, while an encoding region, which is printed with visibly-opaque, infrared-opaque ink, and that does not reflect light above the threshold light intensity is active. For purposes of this disclosure, active encoding regions are generally described as regions printed with visibly-opaque, infrared-transparent ink.

As shown in FIG. 1, encoding regions 1028A and 1028C are printed with a combination of visibly-opaque, infrared-transparent CMY ink (e.g., "process black") and encoding region 1028B is printed with visibly-opaque, infrared-opaque inks. For purposes of illustration, encoding region 1028B printed with the visibly-opaque, infrared-transparent CMY ink is shown as cross-hatched in FIG. 1, although under the human-visible light spectrum, encoding region 1028B may appear as other non-encoding regions of information 1026A (e.g., flat black). In FIG. 1, printed information 1026A, may be printed with a combination of visibly-opaque, infrared-opaque black ink except for the location of embedded data units 1028.

When printed information 1026 is exposed to infrared light 1027 from light source 1004, the infrared light will reflect back to image capture device 1002 from locations corresponding to active encoding regions 1028A and 1028C. Since inactive encoding region 1028B is printed with visibly-opaque, infrared-opaque inks, infrared light 1027 is absorbed within the boundary of the '2' character everywhere except active encoding regions 1028A and 1028C. Infrared light will reflect from optically active article 1008 at the locations of active encoding regions 1028A and 1028B, as well as other active encoding regions of optically active article 1008 that are printed with visibly-opaque, infrared-transparent inks (and not visibly-opaque, infrared-opaque inks). As such, an infrared image captured by image capture device 1002 will appear as shown in FIG. 1, with whitespace, gaps, or voids in locations printed with visibly-opaque, infrared-transparent inks, while other locations printed with visibly-opaque, infrared-opaque inks will appear as black or otherwise visually distinguishable from the visibly-opaque, infrared-transparent inks.

In some examples, active encoding regions 1028A and 1028C, when printed with visibly-opaque, infrared-transparent inks, appear opaque or black to image capture device 1002 under a first spectral range and appear transparent or white to image capture device 1002 under a second spectral range. Portions of information 1026A (including inactive encoding region 1028B) printed with visibly-opaque, infrared-opaque inks appear opaque or black to image capture device 1002 under the second spectral range and appear opaque or black to image capture device 1002 under the first spectral range. In some examples, the first spectral range is from about 350 nm to about 750 nm (i.e., visible light spectrum) and the second spectral range is from about 700 nm to about 1100 nm (i.e., near infrared spectrum). In some examples, the first spectral range is from about 700 nm to about 850 nm, and the second spectral range is between 860 nm to 1100 nm.

In some examples, active encoding regions 1028A and 1028C appear opaque or black to capture device 1002 under a first lighting condition and appear transparent or white to capture device 1002 under a second lighting condition, whereas inactive encoding region 1028B appears opaque or black to capture device 1002 under the second lighting condition and under the first lighting condition. In some examples, the first lighting condition is an ambient visible condition (i.e., diffuse visible light) and the second lighting condition is a visible retroreflective condition (i.e., coaxial visible light). In some examples, the position of the light source(s) is different in the first and second lighting conditions.

In some examples, suitable printing techniques include screen printing, flexographic printing, thermal mass transfer printing and digital printing such as, for example, laser printing and inkjet printing. One advantage of using digital printing is that information can be easily and quickly customized/altered to meet customer needs, without having to produce new screens or flexographic sleeves.

In some examples, printing of the encoding regions and the non-encoded region portions of the symbols are done in registration so that they completely overlap. In some examples, active encoding regions are printed first on the retroreflective substrate, followed by printing of the non-encoded region portions of the symbols, or vice versa. In some examples, the human-readable information and/or machine-readable information are printed using the materials described in U.S. Patent Application No. 61/969,889, the disclosure of which is incorporated herein by reference in its entirety, although other suitable materials may also be used.

In some examples, encoded regions include at least one of an infrared-reflecting, infrared-scattering and infrared-absorbing material. The use of these materials create contrast in the infrared spectrum, and therefore appear "dark" when viewed under such conditions. Exemplary materials that can be used include those listed in U.S. Pat. No. 8,865,293 (Smithson et al), the disclosure of which is incorporated herein by reference in its entirety.

As shown in FIG. 1, system 1000 may include image capture device 1002. Image capture device 1002 may convert light or electromagnetic radiation sensed by image capture sensors 1006 into information, such as digital image or bitmap comprising a set of pixels. Each pixel may have chrominance and/or luminance components that represent the intensity and/or color of light or electromagnetic radiation. Image capture device 1002 may include one or more image capture sensors 1006 and one or more light sources 1004. In some examples, image capture device 1002 may include image capture sensors 1006 and light sources 1004 in a single integrated device, such as shown in FIG. 1. In other examples, image capture sensors 1006 or light sources 1004 may be separate from or otherwise not integrated in image capture device 1002. Examples of image capture sensors 1006 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In the example, image capture device 1002 includes at least two different sensors for detecting light in two different wavelength spectrums. In some examples, a first image capture and a second image capture sensor substantially concurrently detect the first and second wavelengths. Substantially concurrently may refer to detecting the first and second wavelengths within 10 milliseconds of one another, within 50 milliseconds of one another, or within 1000 milliseconds of one another to name only a few examples.

In some examples, one or more light sources 1004 include a first source of radiation and a second source of radiation. In some examples, the first source of radiation emits radiation in the visible spectrum, and the second source of radiation emits radiation in the near infrared spectrum. In other examples, the first source of radiation and the second source of radiation emit radiation in the near infrared spectrum. As shown in FIG. 1 one or more light sources 1004 may emit radiation (e.g., infrared light 1027) in the near infrared spectrum.

In some examples, image capture device 1002 includes a first lens and a second lens. In some examples, image capture device 1002 captures frames at 50 frames per second (fps). Other exemplary frame capture rates include 60, 30 and 25 fps. It should be apparent to a skilled artisan that frame capture rates are dependent on application and different rates may be used, such as, for example, 1000 or 200 fps. Factors that affect required frame rate are, for example, application (e.g., parking vs, tolling), vertical field of view (e.g., lower frame rates can be used for larger fields of view, but depth of focus can be a problem), and vehicle speed (faster traffic requires a higher frame rate).

In some examples, image capture device 1002 includes at least two channels. The channels may be optical channels. The two optical channels may pass through one lens onto a single sensor. In some examples, image capture device 1002 includes at least one sensor, one lens and one band pass filter per channel. The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, such as, for example, a license plate and its lettering (license plate identifier), while suppressing other features (e.g., other objects, sunlight, headlights); (c) wavelength region (e.g., broadband light in the visible spectrum and used with either color or monochrome sensors); (d) sensor type or characteristics; (e) time exposure; and (f) optical components (e.g., lensing).

In the example of FIG. 1, image capture device 1002 may be stationary or otherwise mounted in a fixed position and the position of optically active article 1008 may not be stationary. Image capture device 1002 may capture one or more images of optically active article 1008 as vehicle 1010 approaches or passes by image capture device 1002. In other examples, however, image capture device 1002 may be not be stationary. For instance, image capture device 1002 may be in another vehicle or moving object. In some examples, image capture device 1002 may be held by a human operator or robotic device, which changes the position of image capture device 1002 relative to optically active article 1008.

In the example of FIG. 1, image capture device 1002 may be communicatively coupled to computing device 112 by one or more communication links 1030A and 1030B. Image capture device 1002 may send images of optically active article 1008 to computing device 1016. Communication links 1030A and 1030B may represent wired or wireless connections. For instance communication links 1030A and 1030B may be wireless Ethernet connections using a WiFi protocol and/or may be wired Ethernet connections using Category 5 or Category 6 cable. Any suitable communication links are possible. In some examples, image capture device 1002 is communicatively coupled to computing device 1016 by a network 1014. Network 1014 may represent any number of one or more network connected devices including by not limited to routers, switches, hubs, and interconnecting communication links that provide for forwarding of packet and/or frame-based data. For instance, network 1014 may represent the Internet, a service provider network, a customer network, or any other suitable network. In other examples, image capture device 1002 is communicatively coupled to computing device 1016 by a direct connection, such as Universal Serial Bus (USB) link.

Computing devices 1016 and 1032 represent any suitable computing systems, which may be remote from image capture device 1002, such as one or more desktop computers, laptop computers, mainframes, servers, cloud computing systems, etc. capable of sending and receiving information with image capture device 1002. In some examples, computing devices 1016 and 1032 implement techniques of this disclosure.

In the example of FIG. 1, optically active article 1008 may be generated initially with instances of information 1026A-1026F that include encoding regions 1028A-1028C and other encoding regions illustrated in FIG. 1. In a manufacturing or printing process, a retroreflective sheet is applied to an aluminum plate and each instance of information 1026A-1027 is printed based on a printing specification that may be provided by a human operator or generated by a machine. A printing specification may specify one or more locations to be printed with visibly-opaque, infrared-opaque inks or visibly-opaque, infrared-transparent inks, i.e., the printing specification may specify one or more active and inactive encoding regions. For instance, the printing specification may specify one or more symbols from a symbol set, where a particular symbol includes one or more encoding regions. The printing specification may indicate which encoding regions embedded in a symbol are printed with visibly-opaque, infrared-opaque inks (e.g., are inactive) and which other encoding regions embedded in the symbol are printed with visibly-opaque, infrared-transparent inks (e.g., are active).

As described above, the printing specification may be generated by a human operator or by a machine. For instance a printer that prints visibly-opaque, infrared-opaque inks and visibly-opaque, infrared-transparent inks may include a user interface and/or be communicatively coupled to a computing device 1032 that provides a user interface by which a human operator can input, specify, or otherwise provide the printing specification for the optically active article. For instance, the human operator may specify one or more symbols to be printed as instances of information 1026A-1026F, as shown in FIG. 1. Each symbol may include one or more encoding regions. The encoding regions may be positioned at fixed, pre-defined positions.

In some instances, computing device 1016 may perform optical character recognition (OCR) of instances of information 1026A-1026F. For instance, computing device 1016 may perform OCR on one or more symbols represented by instances of information 1026A-1026F. However, some symbols, such as a '2' and 'Z' or a 'B' and '8' may be similar in spatial appearance. In some examples, spatial appearance may be the structurally visible representation of a symbol. As the similarity of two symbols increases, the OCR process may be more likely to incorrectly classify an image of one symbol (e.g., '2') as another symbol (e.g., 'Z'). Techniques of this disclosure may reduce incorrect classification of symbols in an OCR process by embedding active encoding regions within symbols at particular locations to increase the dissimilarity above a dissimilarity threshold.

To embed active encoding regions within symbols at particular locations to increase the dissimilarity above a dissimilarity threshold, computing device 1032 may generate a symbol set in which one or more of the symbols may each include one or more active encoding regions. Computing device 1032 may include set generation component 1034 that generates such a symbol set. For instance, computing device 1032 may initially store a symbol set that includes the English alphabet and Arabic numerals.

Initially, symbols in the symbol set may not include any active encoding regions. Generation component 1034 may select a particular symbol from the symbol set, such as the '2' symbol. Generation component 1034 may compare a spatial appearance of the '2' symbol to one or more of the other remaining symbols in the symbol set, such as the 'Z' symbol. In some examples, the comparison may perform a pair-wise comparison of the '2' symbol and the 'Z' symbol to determine a degree of dissimilarity between the two symbols. For instance, each of the 'Z' symbol and the '2' symbol may be represented as data comprising separate gray-scale arrays of integers from 0 to 255. Each array location may correspond to a location of a portion of the symbol or a portion of whitespace surrounding the symbol. An integer in the range of 0 to 255 may represent an intensity of luminance, where 0 may represent pure white, 255 represents pure black, and values within the range represent various intensities of black. In some examples, the white-black spectrum may be inverted as values 255 to 0.

In some examples, the degree of dissimilarity between the 'Z' symbol and the '2' symbol may be the entry-wise L2 norm between the respective gray-scale arrays for the 'Z' symbol and the '2' symbol. Accordingly, generation component 1034 may determine separate degrees of dissimilarity between the '2' symbol and other symbols in the symbol set. Although, a degree of dissimilarity is described as the entry-wise L2 norm between respective gray-scale arrays in FIG. 1, set generation component 1034 may use any suitable comparison technique to calculate a degree of dissimilarity between two symbols.

Based on a comparison of the respective gray-scale arrays for the 'Z' symbol and the '2' symbol, set generation component 1034 may determine a degree of dissimilarity between the two symbols. Set generation component 1034 may determine that the degree of dissimilarity satisfies (e.g., the degree of dissimilarity is less than or equal to the threshold) a threshold (e.g., a first threshold). The threshold may be a pre-defined value that is hardcoded, set by a user, or machine-generated. For instance, the threshold may be a minimum amount of dissimilarity between two symbols.

If the degree of similarity is less than or equal to the minimum amount of dissimilarity, set generation component 1034 may modify the symbol to store data that represents the active encoding region embedded in the particular symbol at a particular location. Rather than embedding the active encoding region at any possible location within the symbol, set generation component 1034 evaluates a set of possible locations within the symbol at which the active encoding region may be positioned. For instance, encoding regions 1028A, 1028B, and 1028C represent three possible locations to embed an active encoding region, although many other encoding regions are also possible within the symbol '2' represented by instance of information 1026A. Set generation component 1034 may select a location from the set of possible locations to embed the active encoding region at a location that increases a degree of dissimilarity between, for example, the '2' symbol and the 'Z' symbol. In some examples, set generation component 1034 selects a location from the set of possible locations to embed the active encoding region at a location that increases a degree of dissimilarity. Set generation component 1034 may embed multiple active encoding regions a different locations that increase the degree of dissimilarity. To embed an active encoding region in a symbol, set generation component 1034 may change integer values within the grayscale array for the symbol. For instance, at a location (e.g., a point/pixel, a region, or area) of the grayscale array for the symbol, set generation component 1034 may modify the integer value, such as changing a black value of 255 to a 0 value of white. In this way, the grayscale array for the symbol appears as though an active encoding region is included within the symbol.

In some examples, a first set of pixel values of an image, which represent one or more active encoding regions of the one or more encoding regions, are within a first range of pixel values. In some examples, a second set of pixel values, which represent a remaining portion of the at least one symbol that excludes the one or more active encoding regions, are within a second range of pixel values that are different from the first range of pixel values. In some examples, the image is a first image and wherein the first image of the optically active article is captured in a first spectral range within the near-infrared spectrum, a second image of the optically active article is captured in a second spectral range within the visible spectrum, and a third set of pixel values that represent the at least one symbol in the second image are within the second range of pixel values, and wherein a first proportion of the third set of pixel values that represent the at least one symbol is greater than a second proportion of the second set of pixel values that represent the at least one symbol. In some examples, a symbol may be embodied in a vectorized representation. Computing device 116 may transform the symbol representation between bitmaps and vectorized representations. For instance, upon including one or more active encoding regions within a symbol, while the symbol is represented in bitmap form, computing device 116 may transform the modified bitmap back to vectorized representation for use in the printing or fabrication process.

In some examples, upon embedding one or more active encoding regions in the '2' symbol, set generation component 1034 may again compare a spatial appearance of the modified '2' symbol (with the one or more active encoding regions) to one or more of the other remaining symbols in the symbol set, such as the 'Z' symbol. For instance, set generation component 1034 may compare the spatial appearance of the modified '2' to one or more other symbols including the 'Z' symbol in the symbol set. Set generation component 1034 may determine whether the degree of similarity between the modified '2' and at least one other symbol in the symbol set satisfies (e.g., greater than or equal to) a threshold (e.g., a second threshold). In some examples, set generation component 1034 may determine that any degree of similarity between any two symbols in the symbol set satisfies a threshold. That is, all of the symbols are at least dissimilar by a degree greater than or equal to the threshold. For instance, set generation component may identify a particular location from a plurality of locations within the particular symbol to include an active encoding region that increases a degree of dissimilarity between the updated spatial appearance of the particular symbol and all symbols of the symbol set to satisfy the threshold. Set generation component 1034 may repeatedly perform the process as described above to add active encoding regions at locations of symbols in order to increase the amount of dissimilarity above a threshold. In some examples, set generation component 1034 updates the symbol set by replacing the previous version of a symbol with a modified version that includes one or more different or additional active encoding regions at one or more different locations of the symbol. In some examples, set generation component 1034 may identify other locations within a symbol that provide a lesser degree of dissimilarity between two symbols than other locations within the symbol. For instance, set generation component 1034 may identify a second location from a plurality of locations within a particular symbol that, when embedded with an active encoding region, increases the degree of dissimilarity between an updated spatial appearance of the particular symbol and at least a spatial appearance of another symbol by less than the degree of similarity between a different updated spatial appearance and at least the spatial appearance of another symbol when embedded with an active encoding region at a first location of the symbol. In such instances, set generation component 1034 may refrain from modifying the symbol to store data that represents the active encoding region embedded in the particular symbol at the second location. As described above, in some examples, rather than determining a posteriori that a particular symbol is erroneously classified as another by an OCR system and adding a distinguishing mark to the particular symbol, techniques of the disclosure may a priori identify symbols with dissimilarity less than a threshold and modify such symbols to increase the dissimilarity above a threshold. As such, in some examples, techniques of the disclosure may not rely on misclassification of symbols in OCR to update the spatial appearances of symbols to increase dissimilarity, but rather may generate symbol set with symbols that have a degree of dissimilarity that satisfies a threshold prior to any classification or misclassification of such symbols using OCR.

In some examples, set generation component 1034 may generate an updated symbol set wherein a degree of dissimilarity between at least two symbols satisfies a threshold. The updated symbol set may be stored at computing device 1016 as OCR data that is used by OCR component 1018 to recognize different symbols. In some examples, computing device 1032 may include a construction component 136 that generates a printing specification based on one or more user inputs. For instance, construction component 136 may receive a user input that specifies string "250 RZA". Construction component 136 may select from the updated symbol set, symbols that represent "250 RZA" and include the symbols in a printing specification. The printing specification may include data that indicates locations within each symbol that encode active encoding regions based on the selected symbols from the symbol set. For instance, the printing specification may indicate that locations corresponding to active encoding regions 1028A and 1028C shall be printed with visibly-opaque, infrared-transparent ink and the remaining area of the symbol '2' (e.g., instance of information 1026A) shall be printed with visibly-opaque, infrared-opaque ink.

In some examples, computing device 1032 may be communicatively coupled to a printer or other fabrication device that is capable of disposing the symbols on an optically active article in accordance with a printing specification. The printer or other fabrication device may print, for example, visibly-opaque, infrared-transparent ink at active encoding regions 1028A and 1028C and print the remaining area of the symbol '2' (e.g., instance of information 1026A) with visibly-opaque, infrared-opaque ink. In other examples, the printer or other fabrication device may print, for example, visibly-opaque, infrared-opaque ink at active encoding regions 1028A and 1028C and print the remaining area of the symbol '2' (e.g., instance of information 1026A) with visibly-opaque, infrared-transparent ink. In this way, the printer may construct the optically active article with symbols that include active encoding regions positions to provide a degree of dissimilarity that satisfies a pre-defined threshold. Although set generation component 1034 and construction component 136 are shown as being included in the same computing device 1032, in some examples, components 1034 and 138 may be included in separate computing devices. Computing device 1032 is communicatively coupled to network 1014 by communication link 1030C.

In the example of FIG. 1, computing device 1016 includes an optical character recognition component 1018 (or "OCR module 1018), service component 1022 and user interface (UI) component 1024. Components 1018, 1022, and 1024 may perform operations described herein using software, hardware, firmware, or a mixture of both hardware, software, and firmware residing in and executing on computing device 1016 and/or at one or more other remote computing devices. In some examples, components 1018, 1022 may be implemented as hardware, software, and/or a combination of hardware and software. Computing device 1016 may execute components 1018, 1022 with one or more processors. Computing device 1016 may execute any of components 1018, 1022 as or within a virtual machine executing on underlying hardware. Components 1018, 1022 may be implemented in various ways. For example, any of components 1018, 1022 may be implemented as a downloadable or pre-installed application or "app." In another example, any of components 1018, 1022 may be implemented as part of an operating system of computing device 1016.

After optically active article 1008 has been constructed, it may be attached to vehicle 1010. In the example of FIG. 1, vehicle 1010 may be driving on a roadway and approach image capture device 1002. Image capture device 1002 may cause light source 1004 to project infrared light 1027 in the direction of vehicle 1010. At substantially the same time as light source 1004 is projecting infrared light 1027, image capture device 1006 may capture one or more images of optically active article 1008, such as image 1009. Substantially the same time may be at the same time or within 10 milliseconds, 50, milliseconds, or 1000 milliseconds. Image 1009 may be a bitmap in which visibly-opaque, infrared-opaque inks appear as black pixels and visibly-opaque, infrared-transparent inks appear as white pixels. The resulting image 1009 may be stored as a bitmap, which image capture device 1002 sends to computing device 1016 via network 1014.

OCR component 1018 initially receives the bitmap representing image 1009, which represents symbols as instances of information 1026A-1026F. As shown in FIG. 1, image 1009 includes at least one symbol (e.g., a '2') that comprises a set of one or more active encoding regions 1028A, 1028C embedded with the symbol. In response to receiving image 1009, OCR component 1018 performs optical character recognition on an image region 1029 that includes instance of information 1026A. Based on OCR component 1018 performing optical character recognition, OCR component 1018 determines that image region 1029 of image 1009 represents the at least one symbol '2'. OCR component 1018 may implement any one or more OCR techniques including but not limited to matrix matching and feature matching. Matrix matching may perform pixel-by-pixel comparison of one or more portions of image region 1029 to a set of one or more stored glyphs, one of which corresponds to the symbol '2'. Feature matching decomposes various features (e.g., lines, loops, line direction, intersections, etc.) of the instance of information 1026A, which are compared to glyph features of a set of corresponding symbols to identify the symbol '2'. In any case, OCR component 1018 may perform the optical character recognition using a symbol set that was generated by set generation component 1034.

Because instance of information 1026A includes active encoding regions 1028A, 1028C, OCR component 1018 may be less likely to incorrectly classify the '2' symbol represented by instance of information 1026A with as a 'Z' that is represented by instance of information 1026E. As described above, the arrangement of the set of one or more active encoding regions 1028A and 1028C within the at least one symbol provides a degree of character dissimilarity between the at least one symbol and another symbol in the symbol set that satisfies a pre-defined threshold (e.g., the second threshold). In some examples, an arrangement may refer to the positioning of one or more active encoding regions.

Service component 1022 may receive one or more values, such as a character string "250 RZA" from OCR component 1018. Service component 1022 may be provide any number of services, by performing one or more operations. For instance, service component 1022 may provide a toll collection service, a vehicle registration verification service, a security service or any other suitable service. A toll collection service may identify a vehicle and collect a tolling fee from a payment account of the vehicle owner. For instance, a value received by service component 1022 may include information that is usable by to collect the tolling fee. A vehicle registration verification service may verify that vehicle registration is current, based on the value, by accessing a registration database. A security service may determine whether a particular license plate associated with the vehicle is counterfeit based on the value or absence thereof. Any other suitable services may also be provided by service component 1022. In the example of FIG. 1, service component 1022 may determine whether the license plate associated with the vehicle is counterfeit based on the license plate character string. Service component 1022 may send data to UI component 1024 that indicates whether the license plate is counterfeit.

Computing device 1000 may also include UI component 1006. UI component 1006 of computing device 1002 may receive indications of user input from input devices such as a touch screen, keyboard, mouse, camera, sensor or any other input device. UI component 1006 may transmit, as output to other modules and/or components, the indications of user input, such that other components may perform operations. UI component 1006 may act as an intermediary between various components and modules of computing device 1016 to process and send input detected by input devices to other components and modules, and generate output from other components and modules that may be presented at one or more output devices. For instance, UI component 1006 may generate one or more user interfaces for display. The user interfaces may correspond to services provided by one or more of service components 112. For instance, if the license plate for vehicle 1010 has expired, UI component 1006 may generate an alert that is output for display in a graphical user interface. UI component 1006 may, in some examples, generate one or more alerts, reports, or other communications that are sent to one or more other computing devices. Such alerts may include but are not limited to: emails, text messages, lists, phone calls, or any other suitable communications.

Figure 2:
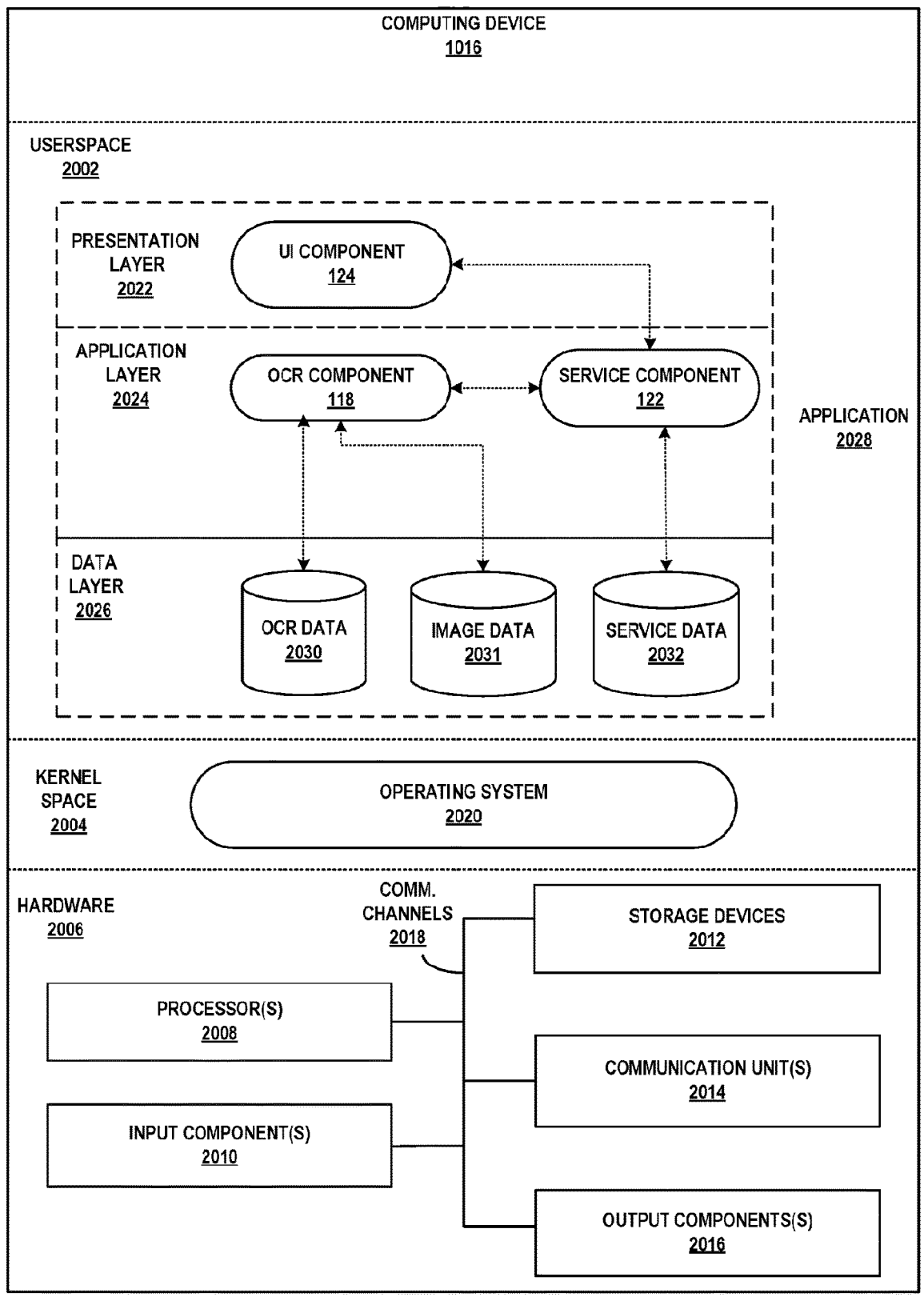
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 1016, as shown in FIG. 1.

Many other examples of computing device 1016 may be used in other instances and may include a subset of the components included in example computing device 1016 or may include additional components not shown example computing device 1016 in FIG. 2. In some examples, computing device 1016 may be a server, tablet computing device, smartphone, wrist- or head-worn computing device, laptop, desktop computing device, or any other computing device that may run a set, subset, or superset of functionality included in application 2028.

As shown in the example of FIG. 2, computing device 1016 may be logically divided into user space 2002, kernel space 2004, and hardware 2006. Hardware 2006 may include one or more hardware components that provide an operating environment for components executing in user space 2002 and kernel space 2004. User space 2002 and kernel space 2004 may represent different sections or segmentations of memory, where kernel space 2004 provides higher privileges to processes and threads than user space 2002. For instance, kernel space 2004 may include operating system 2020, which operates with higher privileges than components executing in user space 2002.

As shown in FIG. 2, hardware 2006 includes one or more processors 2008, input components 2010, storage devices 2012, communication units 2014, and output components 2016. Processors 2008, input components 2010, storage devices 2012, communication units 2014, and output components 2016 may each be interconnected by one or more communication channels 2018. Communication channels 2018 may interconnect each of the components 2008, 2010, 2012, 2014, and 2016 for inter-component communications (physically, communicatively, and/or operatively). In some examples, communication channels 2018 may include a hardware bus, a network connection, one or more inter-process communication data structures, or any other components for communicating data between hardware and/or software.

One or more processors 2008 may implement functionality and/or execute instructions within computing device 1016. For example, processors 2008 on computing device 1016 may receive and execute instructions stored by storage devices 2012 that provide the functionality of components included in kernel space 2004 and user space 2002. These instructions executed by processors 2008 may cause computing device 1016 to store and/or modify information, within storage devices 2012 during program execution. Processors 2008 may execute instructions of components in kernel space 2004 and user space 2002 to perform one or more operations in accordance with techniques of this disclosure. That is, components included in user space 2002 and kernel space 2004 may be operable by processors 2008 to perform various functions described herein.

One or more input components 242 of computing device 1016 may receive input. Examples of input are tactile, audio, kinetic, and optical input, to name only a few examples. Input components 242 of computing device 1016, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 2016 of computing device 1016 may generate output. Examples of output are tactile, audio, and video output. Output components 2016 of computing device 1016, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 2016 may be integrated with computing device 1016 in some examples. In other examples, output components 2016 may be physically external to and separate from computing device 1016, but may be operably coupled to computing device 1016 via wired or wireless communication. An output component may be a built-in component of computing device 1016 located within and physically connected to the external packaging of computing device 1016 (e.g., a screen on a mobile phone). In another example, an output component may be an external component of computing device 1016 located outside and physically separated from the packaging of computing device 1016 (e.g., a monitor, a projector, etc. that shares a wired and/or wireless data path with a tablet computer).

One or more communication units 2014 of computing device 1016 may communicate with external devices by transmitting and/or receiving data. For example, computing device 1016 may use communication units 2014 to transmit and/or receive radio signals on a radio network such as a cellular radio network. In some examples, communication units 2014 may transmit and/or receive satellite signals on a satellite network such as a Global Positioning System (GPS) network. Examples of communication units 2014 include a network interface card (e.g. such as an Ethernet card), an optical transceiver, a radio frequency transceiver, a GPS receiver, or any other type of device that can send and/or receive information. Other examples of communication units 2014 may include Bluetooth®, GPS, 3G, 4G, and Wi-Fi® radios found in mobile devices as well as Universal Serial Bus (USB) controllers and the like.

One or more storage devices 2012 within computing device 1016 may store information for processing during operation of computing device 1016. In some examples, storage device 2012 is a temporary memory, meaning that a primary purpose of storage device 2012 is not long-term storage. Storage devices 2012 on computing device 1016 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 2012, in some examples, also include one or more computer-readable storage media. Storage devices 2012 may be configured to store larger amounts of information than volatile memory. Storage devices 2012 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 2012 may store program instructions and/or data associated with components included in user space 2002 and/or kernel space 2004.

As shown in FIG. 2, application 2028 executes in user-space 2002 of computing device 1016. Application 2028 may be logically divided into presentation layer 2022, application layer 2024, and data layer 2026. Presentation layer 2022 may include user interface (UI) component 2028, which generates and renders user interfaces of application 2028. Application 2028 may include, but is not limited to: UI component 1024, OCR component 1018, and one or more service components 1022. For instance, application layer 2024 may include OCR component 1018 and service component 1022. Presentation layer 2022 may include UI component 1024.

Data layer 2026 may include one or more datastores. A datastore may store data in structure or unstructured form. Example datastores may be any one or more of a relational database management system, online analytical processing database, table, or any other suitable structure for storing data. OCR datastore 2030 may include matrix matching data to perform pixel-by-pixel comparisons, such as stored glyphs. OCR datastore 2030 may include feature matching data to perform feature identification, such as glyph features of a set of corresponding symbols. Service data 2032 may include any data to provide and/or resulting from providing a service of service component 1022. For instance, service data may include vehicle registration information, security information (e.g., cyclic redundancy codes or checks), user information, or any other information. Image data 2031 may include one or more images that are received from one or more image capture devices. In some examples, the images are bitmaps, Joint Photographic Experts Group images (JPEGs), Portable Network Graphics images (PNGs), or any other suitable graphics file formats.

In the example of FIG. 2, one or more of communication units 2014 may receive, from an image capture device, an image of an optically active article that includes a set of one or more symbols of a symbol set. In some examples, UI component 1024 or any one or more components of application layer 2024 may receive the image of the optically active article and store the image in image data 2031. At least one symbol of the set of one or more symbols represented in the image comprises a set of one or more encoding regions that are embedded with the symbol.

In response to receiving the image, OCR component 1018 may compare a first spatial appearance of the particular symbol to a second spatial appearance of another symbol of the symbol set, wherein the first spatial appearance and the second spatial appearance are based on a particular lighting condition. In the example of FIG. 2, the lighting condition may be an infrared lighting condition. As described in FIG. 1, by applying one or more OCR techniques to the image region, OCR component 1018 may determine that the image region represents the symbol '2'. As an example, OCR component 1018 may compare the image region to OCR data 2030 to identify a match. Because the symbol includes active encoding regions 1028A, 1028C, OCR component 1018 may be less likely to incorrectly classify the '2' symbol as a 'Z' symbol. OCR component 1018 may determine one or more symbols included within the optically active article. In some examples, the one or more symbols represented in the optically active article be referred to as or more values.

Service component 1022 may perform one or more operations based on the one or more particular values, such as performing a security check to determine whether the optically active article (e.g., license plate) is a counterfeit. Service component 1022 may, for example, query service data 2032 to select a CRC code or CRC check data. Service component 1022 may use the service data 2032 to confirm whether the optically active article is a counterfeit. In response to, for example, determining that the optically active article is a counterfeit, service component 1022 may send data to UI component 1024 that causes UI component 1024 to generate an alert for display. UI component 1024 may send data to an output component of output components 2016 that causes the output component to display the alert.

In some examples, computing device 1016 may receive multiple images of an optically active article within a particular time duration. For instance, an image capture device may send multiple images to computing device 1016 that were each taken within a particular time duration. In some examples, the time duration may be 50 milliseconds, 500 milliseconds, 1 second or 5 seconds. In some examples, the time duration may be any value between 10 milliseconds and 10 seconds. Application 2028 may, perform the techniques as described above in FIG. 2, but repeatedly for each image captured within the particular time duration. OCR component 1018 may evaluate the values for each image and provide a value to service component 1022 that occurred most frequently or that was the most likely value.

In some examples, the term "human-readable information" refers to information that can be read and comprehended by a human without further machine translation. Examples of human-readable information include, but are not limited to, alphanumeric characters, designs, geometric shapes, symbols, and Asian or Arabic language characters. In some examples, human-readable information does not include encoded information that is not comprehended by a human, without further translations of a machine, such as, for example, barcodes. In some examples, the human-readable information is made visible or invisible to an appropriate optical detector (e.g., human eye) under certain conditions.

In some examples, the term "machine-readable information" refers to information that is encoded in a form that can be optically imaged by a machine or computer and interpreted by its hardware and software, but not by a human. In some examples, the machine-readable information is made visible or invisible to an appropriate optical detector (e.g., camera) under certain conditions.

Existing ALPR systems or machine vision systems may include at least one optical detector (e.g., camera) and software associated with the detector. The optical detector captures at least one image of an object of interest under a first condition. The object of interest may be, for example, a vehicle license plate, a vehicle validation sticker, a signage, a secure document, and a conspicuity sheeting. The image is then analyzed by the associated software, and useful information is extracted from such image. In some instances, extraction of information from an image is also referred to as reading the object, or reading information disposed on the object.

Some techniques of this disclosure relate to machine-readable information comprising embedded-markers that are placed to maximize (or increase above a threshold) differences between similar human-readable information (e.g., characters), and as a result, improving character differentiation. In one aspect, the embedded-markers are placed in a predetermined location to create a font or set of machine-readable characters that maximizes (or increases above a threshold) differences between similar characters. Strategic and predetermined gap placement is conducted using a method that selectively chooses embedded-marker locations which result in the highest possible character differentiation. In some examples, the embedded-marker includes at least one gap or discontinuous portion. In some examples, the present methods include a gap placement algorithm which seeks to select gap locations which create the greatest number (number above a threshold) of differences in similar characters. As a result, the embedded-markers (e.g., gaps)

form machine-readable information (e.g., machine-readable characters) which the OCR engine can more easily distinguish.

In addition, in the present articles and methods, it may not be necessary to read both human-readable information and machine-readable information for an accurate detection and read of the human-readable information. For instance, the presently disclosed machine-readable information corresponds to predetermined human-readable information. As such, in some examples, only one image of the retroreflective article needs to be taken, under a condition that allows the machine-readable information to become visible and detectable.

In one aspect, the present application relates to a retroreflective article comprising a retroreflective substrate and a machine-readable information disposed on at least a portion of the retroreflective substrate, wherein the machine-readable information corresponds to a predetermined human-readable information. In some examples, the article is one of a signage, a validation sticker, conspicuity sheeting, a secure document and a license plate. By "the machine-readable information corresponds to a predetermined human-readable information", it may be meant that the machine-readable information is virtually the same as the human-readable portion, except that the machine-readable information may require further machine translation to be comprehensible by a human. That is, for an article comprising human-readable information and machine-readable information, a machine vision system reading the machine-readable information obtains the same information as a human reading the human-readable information.

In some examples, the present application relates to methods and systems for reading an article, such as, for example, a license plate. The machine-readable information provided herein may be used to accurately identify and/or read the license plate without having to rely on an independent read or image of human-readable information.

In some instances, human-readable information disposed on the substrate comprises connected characters. In some languages or fonts, characters are cursive (i.e., flowing or connected), meaning that there is no visible separation or gap between one character to the other. Exemplary languages that are free flowing include Arabic, Persian and Urdu. Similarly, other languages or fonts may have independent characters (i.e., not connected to one another) but may include connecting elements disposed above or below a given string of characters or non collinear characters. Exemplary languages of this type include Siamese. These fonts and/or languages are particularly difficult to be read by machine vision systems as they do not have clear character segmentation.

In some examples, the present methods are useful in providing character segmentation in machine-readable information that correspond to human-readable information comprising connected characters.

In some examples, the machine-readable information comprises at least one embedded-marker. The embedded-marker may comprise at least one discontinuity or gap in at least one human-readable character. The gap is strategically selected and placed in a predetermined location so that the machine-readable information corresponds to a predetermined human-readable information. Specific gap placements help machine vision systems clearly differentiate information from similar shapes or forms, such as those shown in FIG. 3.

Figure 3:
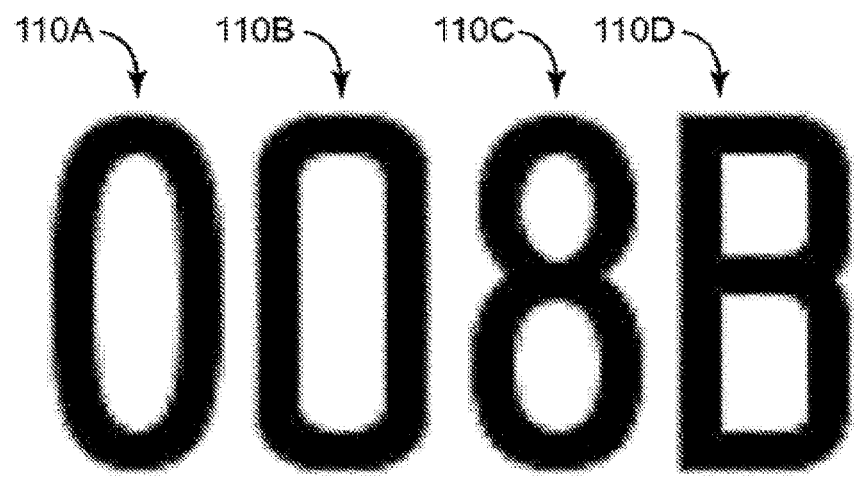
FIG. 3 depicts exemplary characters that are similarly shaped.

FIG. 3 illustrates human-readable characters 110A, 110B, 110C, 110D, that are similarly shaped and difficult to be differentiated by current ALPR systems, such as, for example, "0" (zero), "O" (letter "o"), "8" and "B".

Figure 4:
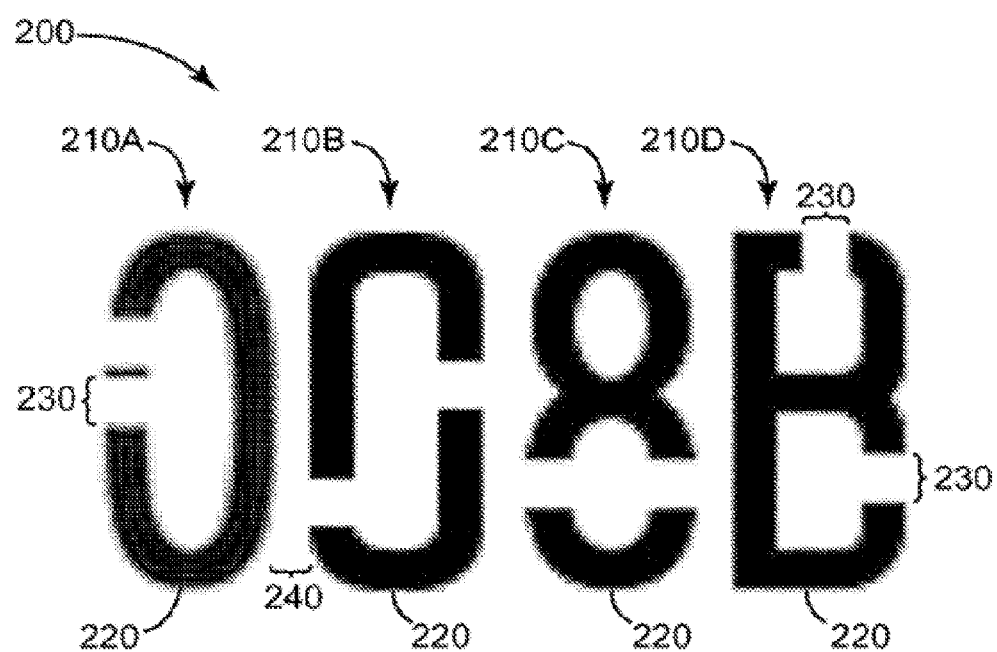
FIG. 4 depicts one exemplary embodiment of a machine-readable information according to the present application.

FIG. 4 shows one example of a machine-readable information 200 according to the present application. The machine-readable information comprises several independent (i.e., not connected) machine-readable information 2010A, 2010B, 2010C, 2010D, wherein each machine-readable information 210A, 210B, 210C, 210D comprises embedded-markers. The embedded-markers shown include at least one continuous portion 220 and a discontinuous portion or gap 230. Character segmentation 240 between adjacent machine-readable information is also shown.

One example of embedded-markers includes discontinuous portions or gaps which are present in the machine-readable information. Another example of embedded-markers includes geometric shapes or symbols present in the machine-readable information, such as, for example, at least one of dots or circles (hollow or solid), triangles, squares, stars, asterisks, outline of a character, etc.

Such embedded-markers are strategically placed and sized. In some examples, the present application relates to a method of encoding machine-readable information so that it may be subsequently decoded. In one aspect, the present method comprises an encoder that will accept any basic symbol (e.g., a star, dot, an outline of a character, geometric shape) or character as input to create a machine-readable information comprising embedded-markers as an output. In some examples, the encoder relies on maximizing (or increasing above particular threshold) minimum pairwise character dissimilarity over a predetermined set of constraints. In this particular example, character dissimilarity is measured by an L1-norm between any two characters. The present embedded-marker placement method allows for the use of any pairwise distance function (e.g., pairwise difference), wherein "similar" characters are those with the smallest pairwise distance. Machine-readable embedded-markers are placed in characters to increase the pairwise distance for the most similar characters. With the present method, the embedded-marker placement strategy may yield the maximum (or greater than a threshold) distance between the most similar characters. For instance, the present method may provide degree of dissimilarity that is greater than or equal to at least 80% of a maximum degree of dissimilarity within a range of degrees of dissimilarity.

Exemplary sets of constraints include, but are not limited to, at least one of: size of embedded-marker, number of embedded-markers, percent of original character remaining, embedded-marker orientation, inter-character embedded-marker location, and embedded-marker shape.

In some examples, the term "human-readable information" refers to information that can be read and comprehended by a human without further machine translation. Examples of human-readable information include, but are not limited to, alphanumeric characters, designs, geometric shapes, symbols, and Asian or Arabic language characters. In some examples, human-readable information does not include encoded information that is not comprehended by a human, without further translations of a machine, such as, for example, barcodes. In some examples, the human-readable information is made visible or invisible to an appropriate optical detector (e.g., human eye) under certain conditions.

In some examples, the term "machine-readable information" refers to information that is encoded in a form that can be optically imaged by a machine or computer and interpreted by its hardware and software, but not by a human. In some examples, the machine-readable information is made visible or invisible to an appropriate optical detector (e.g., camera) under certain conditions.

In some examples, the human-readable information is visible to an optical detector under a first spectral range and invisible to the optical detector under a second spectral range, whereas the machine-readable information is visible to the optical detector under the second spectral range but invisible under the first spectral range. In some examples, the machine-readable information is an embedded machine-readable information. In some examples, the first spectral range is from about 350 nm to about 750 nm (i.e., visible light spectrum) and the second spectral range is from about 700 nm to about 1100 nm (i.e., near infrared spectrum). In some examples, the first spectral range is from about 700 nm to about 850 nm, and the second spectral range is between 860 nm to 1100 nm. In some examples, the human-readable information is visible to the detector under a first lighting condition and invisible to the detector under a second lighting condition, whereas the machine-readable information is visible to the detector under the second lighting condition but invisible under the first lighting condition. In some examples, the first lighting condition is an ambient visible condition (i.e., diffuse visible light) and the second lighting condition is a visible retroreflective condition (i.e., coaxial visible light). In some examples, the position of the light source(s) is different in the first and second lighting conditions.

In some examples, the machine-readable information is in the form of a binary optical code. In binary optical codes areas of the code may be divided into a set number and geometry of known regions. Regions in an image may then be classified as either light or dark. Light regions or pixels represent a value (e.g., 0 (zero)) and dark regions represent another value (e.g., 1). Large contrast (i.e., difference in brightness) between light and dark regions allow for easier interpretation of the binary optical code.

In some examples, the human-readable information and/or machine-readable information are printed on the retroreflective substrate. Suitable printing techniques include screen printing, flexographic printing, thermal mass transfer printing and digital printing such as, for example, laser printing and inkjet printing. One advantage of using digital printing is that information can be easily and quickly customized/altered to meet customer needs, without having to produce new screens or flexographic sleeves.

In some examples, the machine-readable information is embedded machine-readable information. In these examples, printing of the human-readable information and machine-readable information is done in registration so that they completely overlap. In some examples, the human-readable information is printed first on the retroreflective substrate, followed by printing of the embedded machine-readable information. In other examples, the machine-readable information is printed before the human-readable information. In some examples, the human-readable information is printed visibly-opaque, infrared-transparent inks (e.g., CMY inks), which render the information visible in the visible spectrum and invisible in the infrared spectrum. In some examples, the machine-readable information is printed using visibly-opaque, infrared-opaque inks (e.g., inks containing carbon black), which render the information visible in both the visible spectrum and in the infrared spectrum. In some examples, the machine-readable information is printed on the substrate using visibly-transparent, infrared-opaque inks. In some examples, the human-readable information and/or machine-readable information are printed using the materials described in U.S. Patent Application No. 61/969,889, the disclosure of which is incorporated herein by reference in its entirety.

In some examples, the machine-readable information comprises at least one of an infrared-reflecting, infrared-scattering and infrared-absorbing material. The use of these materials create contrast in the infrared spectrum, and therefore appear "dark" when viewed under such conditions. Exemplary materials that can be used include those listed in U.S. Pat. No. 8,865,293 (Smithson et al), the disclosure of which is incorporated herein by reference in its entirety.

Figure 5B:
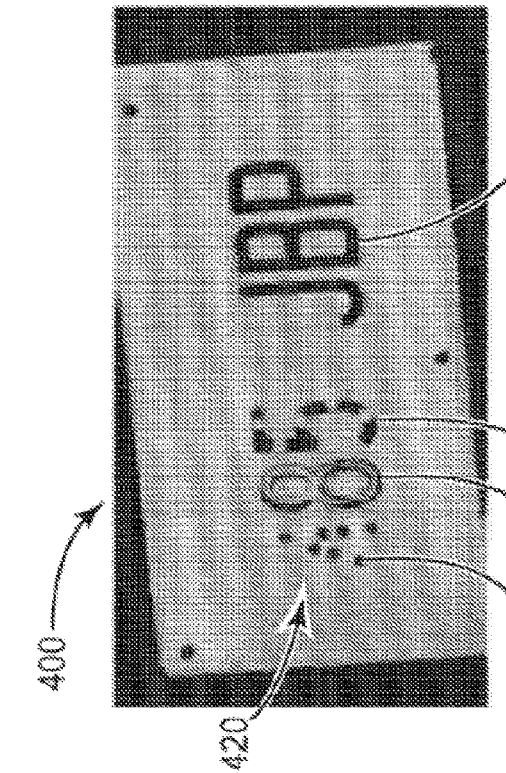
FIG. 5B depicts the retroreflective article shown in FIG. 5A viewed under infrared radiation.
Figure 5A:
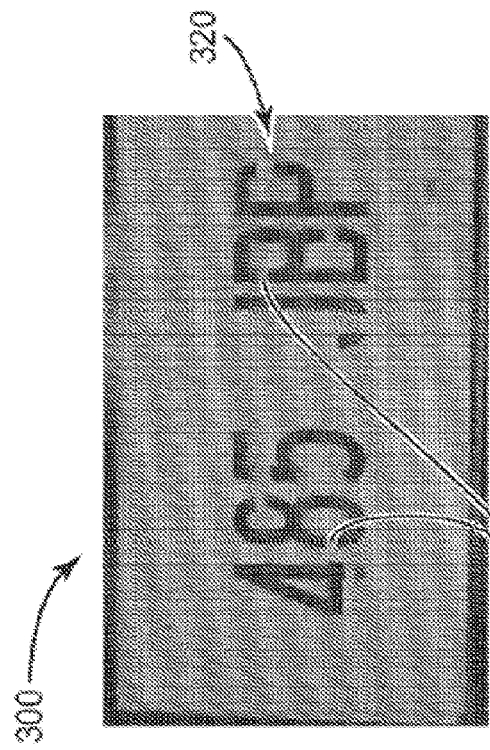
FIG. 5A depicts an exemplary embodiment of a retroreflective article according to the present application viewed under diffuse visible light.

FIG. 5A depicts an illustrative example of the present application under diffuse visible light. In this condition, retroreflective article 300 and human-readable information comprising characters "EXPLORE Minnesota.com" 310 and "485 JBP" 315 are visible. FIG. 5B shows the retroreflective article 300 shown in FIG. 5A under infrared radiation. In this condition, human-readable information comprising characters "EXPLORE Minnesota.com" 310 is not detectable and characters "485 JBP" are invisible to the detector. Under infrared radiation, machine-readable information 320 comprising embedded-markers 330 (e.g., gaps) is visible.

Figure 6B:
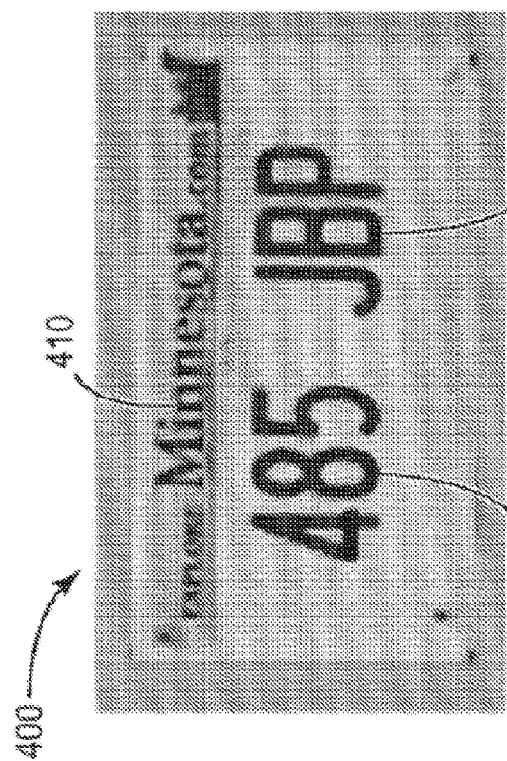
FIG. 6B depicts the retroreflective article shown in FIG. 6A viewed under infrared radiation.
Figure 6A:
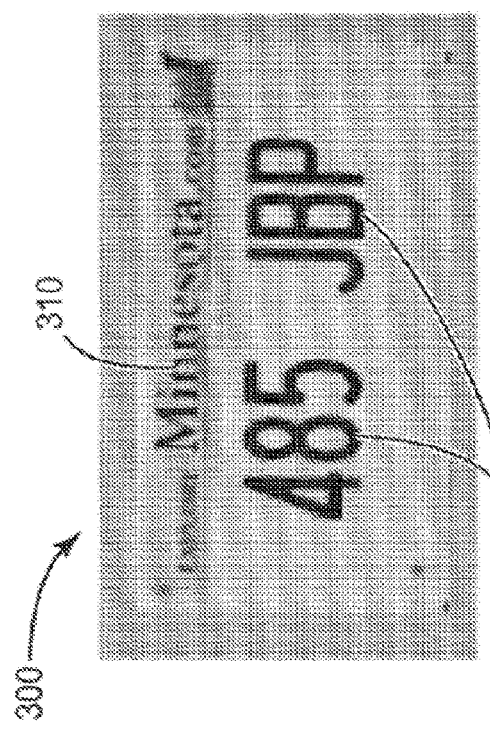
FIG. 6A depicts an exemplary embodiment of a retroreflective article according to the present application viewed under diffuse visible light.

FIG. 6A depicts another illustrative example of the present application under diffuse visible light. In this condition, retroreflective 400 article and human-readable information comprising characters "EXPLORE Minnesota.com" 410, characters "485" 415a and "JBP" 415b are visible. FIG. 6B shows the retroreflective article 400 shown in FIG. 6A under infrared radiation. In this condition, part of the human-readable information, specifically, characters "485", is not substantially visible and instead embedded machine-readable information 420 comprising embedded-markers 430a, 430b and 430c is visible.

In some examples, as shown in FIGS. 5 and 6, the machine-readable information occupies at least some of the same space as the human-readable information and is described as an embedded machine-readable information. The embedded machine-readable information is completely contained within the boundaries of at least a portion of the human-readable information. In some examples, the embedded machine-readable information is concealed by the human-readable information under a first condition.

In some examples, the machine-readable information comprises embedded-markers that include at least one continuous portion and at least one discontinuous portion, wherein the continuous portion and the discontinuous portion in combination correspond to the human-readable information. For example, the embedded-marker of character 210A in FIG. 4 comprises continuous portions 220 and discontinuous portions or gaps 230 that in combination are read as the number "0" (zero) by a machine vision system. As described above, software used in machine vision systems of the present application include an algorithm that identifies the strategically placed embedded-markers in machine-readable information and matches the machine-readable information with known human-readable information, such as, for example, human-readable characters. As a result, allowing the machine vision systems to correctly read the machine-readable information and associate it with a predetermined human-readable information.

In currently available ALPR systems, rotation, alignment, scale and skew of a retroreflective article detected by an optical detector are all calculated using assumed knowledge regarding size and shape of the retroreflective article. These methods do not take into consideration whether the retroreflective article to be detected and read is upright or properly aligned. As a result, existing systems may incorrectly miss or not detect an article that, for example, has been rotated due to environmental conditions such as rain and wind.

Figure 8:
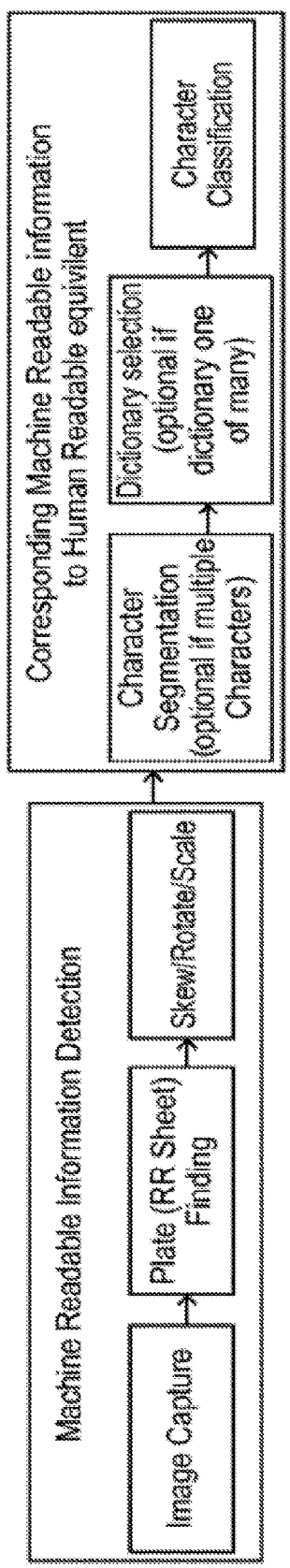
FIG. 8 is a flow diagram illustrating an exemplary method according to the present application.

FIG. 8 is a flow diagram of an exemplary method of reading information provided on a retroreflective article according to the present application. In the depicted method, after an image is captured, a retroreflective article is located within the image, and the image of the retroreflective article is then normalized. After normalization of the image of the article, the disclosed method corresponds the machine-readable information to a predetermined human-readable information using an optional step of character segmentation, followed by selection of a machine-readable information dictionary. As a result, the machine-readable information is classified and read.

Figure 9:
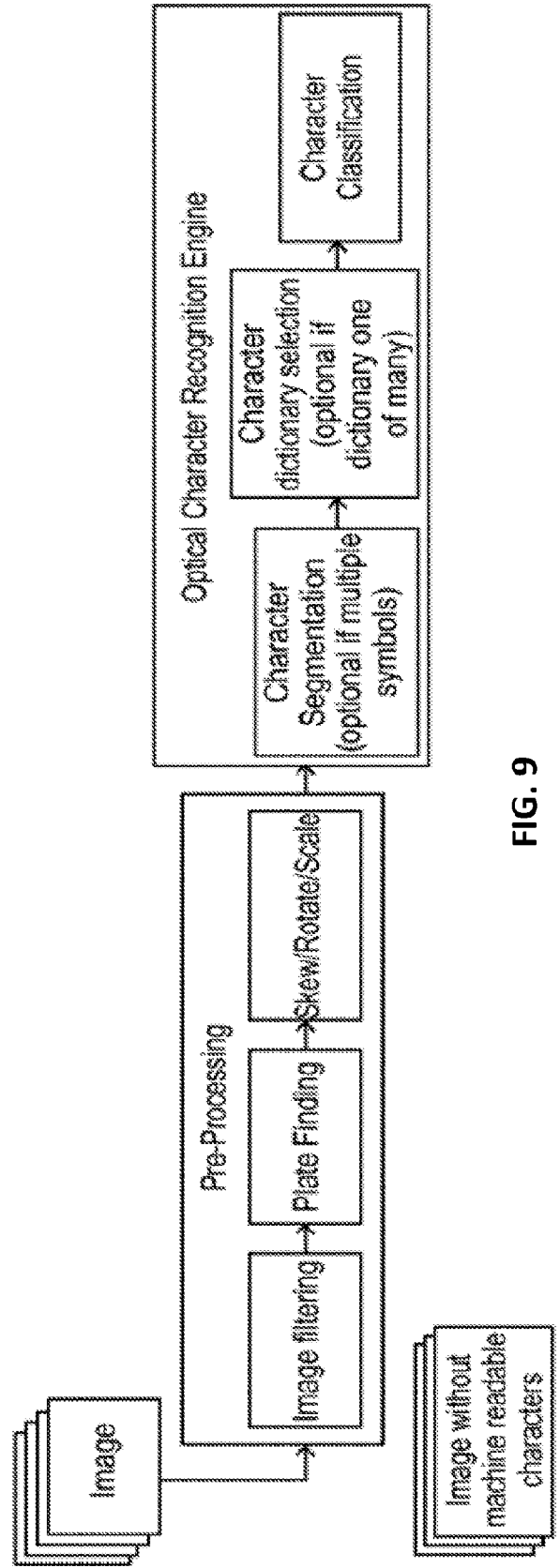
FIG. 9 is a flow diagram illustrating an exemplary method according to the present application.

In some examples, the present method utilizes a pre-processor to provide as output an image which has been normalized and prepared for processing, as shown in FIG. 9. The pre-processor utilizes an image taken by the optical detector and determines if there is an area of high contrast in the image. This process is referred to as image filtering. In some examples, high contrast is effected by the use of optically active substrates (e.g, reflective or retroreflective). Images without high contrast areas are discarded. Remaining images are subsequently advanced to a second pre-processing step in which the image of the high contrast area is isolated and normalized. Normalization includes, for example, de-skew, rotation, size adjustment and scale adjustment of the high contrast area. After normalization, the machine-readable information is corresponded to a predetermined human-readable information.

The present method may further provide additional input to the pre-processor, so that there is a higher probability of producing a properly normalized image of the retroreflective article, as shown in FIGS. 5B and 6B. Exemplary additional input include, but is not limited to, alignment markers comprising vertical and/or horizontal segments parallel to plate edges, and embedded-markers including a predetermined space between markers. In the example where a predetermined space between markers is used, this known distance may be used to determine if the retroreflective article is rotated or skewed. For example, if the distance measured in an image is shorter than the known, predetermined distance, the system may assume skewing of the retroreflective article.

In some examples, the present method further includes an OCR (optical character recognition) engine that binarizes the normalized image. The image is then divided into individual characters using a character separator. The symbol is compared to any active dictionaries loaded into the engine, and the most likely match is chosen. Finally each of these symbols are classified against that dictionary and a resulting symbol set is obtained.

FIG. 10 is a flow diagram depicting one exemplary example of how the machine-readable dictionary is used to correspond the machine-readable information to a predetermined human-readable information. First, a set of constraints is generated based on the rules governing the OCR engine and camera system (e.g., resolution, minimum embedded-marker size, maximum number of embedded-markers per character, allowed shapes of embedded-markers, etc.). This set of constraints along with an input dictionary containing the human-readable fonts or information are included into an iterative embedded-marker placement algorithm. After each iteration, a solution is tested for convergence. If convergence has not been obtained, the algorithm reiterates. Once convergence has been obtained, the resulting output is a new dictionary containing new maximally dissimilar character set of embedded machine-readable information.

FIG. 11A depicts an exemplary license plate 800 according to the present application. The license plate 800 comprises human-readable information 815, 817 and 819 visible under a first condition (i.e., diffuse ambient light) and machine readable information comprising embedded markers 830, 831 visible under a second condition (i.e., infrared light). Embedded-markers 831 were strategically disposed to create character segmentation to otherwise connected characters. Embedded-markers 831 created "vertical lines" in the characters, rendering such markers useful in determining orientation and rotation of the license plate.

The retroreflective article chosen for any specific implementation will depend on the desired optical, structural, and durability characteristics. As such, desirable retroreflective articles and materials will vary based on the intended application. Retroreflective articles and materials include reflective and retroreflective substrates. The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting).

Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light.

Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. A seal layer may be applied to the structured surface to keep contaminants away from individual cube corners. Flexible cube corner sheeting can also be incorporated in examples or implementations of the present application. Retroreflective sheeting for use in connection with the present application can be, for example, either matte or glossy.

The retroreflective articles described herein are ordinarily configured to include sheeting that can be applied to a given object or substrate. The articles are generally optically single-sided. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer.

One use for the retroreflective articles described herein is in license plates that are detected by a license plate detection or recognition system. One exemplary license plate detection system uses a camera and a lighting system to capture license plate images. An image of the scene including the license plate can be made from, for example, ambient visible conditions and from light added by a designated light source (for example, coaxial lighting that directs light rays onto the license plate when the camera is preparing to record an image). The light rays emitted by the coaxial lighting in combination with the retroreflective properties of the license plate create a strong, bright signal from the location of the plate in the otherwise large image scene. The bright signal is used to identify the location of the license plate. Then, the automatic license plate recognition (ALPR) focuses on the region of interest (the region of brightness) and searches for matches to expected human-readable information or embedded machine-readable information by looking for recognizable patterns of contrast. In the present application, only machine-readable information or symbols need to be read by the ALPR system.

In some examples, light in driving and ALPR environments can be divided into the following spectral regions: visible light in the region between about 350 and about 700 nm, and infrared light in the region between about 700 and about 1100 nm. Typical cameras have sensitivity that includes both of these ranges, although the sensitivity of a standard camera system decreases significantly for wavelengths longer than 1100 nm. Various light emitting diodes (LEDs) can emit light over this entire wavelength range, and typically most LEDs are characterized by a central wavelength and a narrow distribution around that wavelength. For example, in a system including LEDs emitting light rays having a wavelength of 830 nm+/−20 nm, a suitably equipped camera could detect a license plate in the near infrared spectrum with light not visible to the driver of the vehicle. Thus the driver would not see the "strobe" light effect of the LEDs and would not be distracted by them.

In some examples, cameras and lights are typically mounted to view the license plates at some angle to the direction of vehicle motion. Exemplary mounting locations include positions above the traffic flow or from the side of the roadway. Images may be collected at an angle of 20 degrees to 45 degrees from normal incidence (head-on) to the license plate. A detector which is sensitive to infrared or ultraviolet light as appropriate may be used to detect retroreflected light outside of the visible spectrum. Exemplary detectors include cameras include those sold by 3M Company of St. Paul, Minn., including but not limited to the P372.

The retroreflective articles described herein can be used to improve the capture efficiency of these license plate detection or recognition systems. ALPR capture can be described as the process of correctly locating and identifying license plate data, including, but not limited to, indicia, plate type, and plate origin. Applications for these automated systems include, but are not limited to, electronic toll systems, red light running systems, speed enforcement systems, vehicle tracking systems, trip timing systems, automated identification and alerting systems, and vehicle access control systems. As is mentioned above, current automatic license plate recognition systems have capture efficiencies that are lower than desired due to, for example, low or inconsistent contrast of indicia as well as obscuring or distracting contrast of artwork and/or indicia on the license plate.

In some examples, retroreflective articles of the present disclosure may also be used in signage. The term "signage" as used herein refers to an article that conveys information, usually by means of alphanumeric characters, symbols, graphics, or other indicia. Specific signage examples include, but are not limited to, signage used for traffic control purposes, street signs, conspicuity sheeting, window stickers, identification materials (e.g., licenses), and vehicle license plates. In some examples, it may be beneficial to use the articles of the present application to employ the desirable property of viewing machine-readable barcodes without changing the appearance of a signage under visible light. Such retroreflective articles would enable the reading of signage specific information meant for general consumption while avoiding driver or sign reader distraction by and/or unwanted detection of "covert" markings, such as variable information of a barcode. Such a development facilitates invisible marking of and/or signaling by articles for security purposes, identification, and inventory control. For example, the covert markings could contain signage-specific information such as, for example, signage material lot number, installation date, reorder information, or product life expectancy.

In another aspect, the present application relates to an optical character recognition process including the steps of providing a retroreflective substrate comprising human-readable information and embedded machine-readable information including at least one embedded-marker; detecting the machine-readable information and reading the machine-readable information by means of an optical character recognition engine; wherein the machine-readable information corresponds to the human-readable information.

In another aspect, the present application relates to a system for reading an article comprising a retroreflective article comprising a human-readable information and a machine-readable information, the machine-readable information comprising at least one gap and at least one solid portion; an optical detector that detects and produces an image of the retroreflective article; a processor that preprocesses the image to locate and normalize the retroreflective article on the image and that finds the machine-readable information on the retroreflective article; and an optical character recognition (OCR) engine that associates the machine-readable information to the human-readable information.

In another aspect, the present application relates to a method of making a retroreflective article comprising providing a retroreflective substrate; applying human-readable information on the retroreflective substrate with a perimeter; applying machine-readable information that comprises an embedded-marker and a solid portion, wherein the machine-readable information is disposed on the retroreflective substrate and is contained within the perimeter of the human-readable information. In some examples, at least one of the steps of applying human-readable information and applying machine-readable information comprises printing.

Objects and advantages of the present application are further illustrated by the following examples, but the particular materials and amounts thereof recited in the examples, as well as other conditions and details, should not be construed to unduly limit the invention, as those of skill in the art will recognize that other parameters, materials, and equipment may be used.

EXAMPLE 1

A license plate 300 as shown in FIGS. 3A and 3B was prepared. A first retroreflective sheeting (commercially available under the trade designation "Digital License Plate Sheeting 3750" by 3M Company, of St. Paul, Minn.) was provided. On the retroreflective sheeting, a background graphic 310 comprising an image of a wooded lake and the characters "Explore Minnesota.com" was printed across the upper portion of the retroreflective sheeting, and human-readable information 315 comprising characters "485 JBP" were centrally printed. Background graphic 310 was printed using visibly-opaque, infrared-transparent cyan, magenta and yellow (CMY) inks (commercially available from 3M under the trade designations, "3M UV Inkjet Ink 1504 Cyan", "3M UV Inkjet Ink 1504 Magenta", "3M UV Inkjet Ink 1506 Yellow"). Human-readable information 315 was printed using a visibly-opaque, infrared-opaque black ink (commercially available from 3M under the trade designations, "3M UV Inkjet Ink 1503 Black"). Both background graphic 310 and human-readable information 315 were printed using a single pass UV inkjet printer (commercially available from 3M Company as "3M High Definition Printer").

A second retroreflective sheeting, similar to the first retroreflective sheeting was provided. Embedded machine-readable information 320 comprising embedded-markers 330 was printed on the second retroreflective sheeting in black using a combination of the CMY inks which are visibly opaque and infrared-transparent. The embedded machine-readable information 320 was then cut out and placed over human-readable information 315 so that the machine-readable information completely overlapped with and was contained within the boundaries of human-readable information 315. The printed retroreflective sheeting was adhered to an aluminum substrate (not shown).

FIG. 3A is a picture of license plate 300 taken in diffuse ambient lighting. Under ambient lighting, the background graphic 310 and human-readable information 315 are seen. FIG. 3B is a picture of the same license plate taken under retroreflected infrared (IR) lighting. The images were captured using a digital SLR camera (model D5500 commercially available from Nikon Corporation of Melville, N.Y.). For the IR image, the camera had the IR cut filter removed from the sensor and a Hoya R72 filter (commercially available on behalf of Hoya from distributor Kenko Tokina, Tokyo, Japan) used to filter visible light.

Under retroreflected IR lighting, human-readable information 315 is not substantially visible and instead, machine-readable information 320 comprising embedded-markers 330 becomes visible to the detector (i.e., camera). The embedded-markers 330 of machine-readable information 320 were gaps strategically placed to maximize character differentiation as previously explained. In addition, some of the gaps were chosen to aid in plate alignment, which occurs during the preprocessing step of the OCR system. Specifically, gaps within what resembles characters "5", "J" and "P" were chosen for plate alignment.

EXAMPLE 2

A license plate 400 as shown in FIGS. 4A and 4B was prepared as generally described in Example 1, except that the machine-readable information 420 comprised embedded-markers 430a, 430b and 430c, prepared as follows.

Machine-readable information 420 was prepared on a second retroreflective sheeting as described in Example 1. Characters "485" were printed using the visibly-opaque, infrared-transparent ink of Example 1. The character "4" was cut out of the second retroreflective sheeting and 7 holes, each one 0.25 in (0.635 cm) in diameter, were then cut out of the character "4" to create embedded-marker 430a. The embedded-marker 430a was placed over character "4" of human-readable information 415, so that it completely overlapped with and was contained within the boundaries of the human-readable information 415. As a result, embedded-marker 430a comprised circles which became visible under retroreflected infrared light.

Character "8" printed on the second retroreflective sheeting was cut from the second retroreflective sheeting and trimmed to be a thinner, narrower version of the same character, creating embedded-marker 430b. Embedded-marker 430b was then placed over and overlapping with character "8" of human-readable information 415.

Similarly, character "5" printed on the second retroreflective sheeting was cut from the second retroreflective sheeting. Five holes, each 0.25 in in diameter were then cut out of character "5" and manually disposed over character "5" of the human-readable information 415, creating embedded-marker 430c.

FIG. 6A is a picture of license plate 400 taken in diffuse ambient lighting. Under ambient lighting, the background graphic 410 and human-readable information 415 are seen. FIG. 6B is a picture of the same license plate 400 taken under retroreflected infrared (IR) lighting. Under retroreflected IR lighting, background graphic 410 and human-readable information 415a are not substantially visible and instead, machine-readable information 420 comprising embedded-markers 430a, 430b, 430c becomes visible to the detector (i.e., camera).

EXAMPLE 3

A license plate 800 shown in FIGS. 8A and 8B was prepared as generally described in Example 1, with the exceptions noted below.

A retroreflective sheeting (commercially available under the trade designation "High Definition License Plate Sheeting 6700" by 3M Company) was provided. On the entire area of the retroreflective sheeting, a patterned background graphic 810 was printed using the CMY inks and UV inkjet printer of Example 1. A blue rectangle 812 was printed on the upper portion of the retroreflective sheeting using the CMY inks. Human-readable information comprising characters "Dubai 5 A.D. U.A.E" 815 and Arabic characters 817 was centrally printed in white on the blue rectangle using the CMY inks. Human-readable information 819 comprising black Arabic characters was centrally printed on the retroreflective sheeting using the black infrared-transparent ink of Example 1.

Embedded-machine-readable information 820 comprising embedded-markers 830 and 831 was centrally printed in registration with human-readable information 819 using the black visibly-opaque, infrared-opaque ink of Example 1.

A vinyl overlaminate film (commercially available from 3M as "9097 Vinyl Protective Overlay Film") was applied over the printed retroreflective sheeting.

FIG. 11A is a picture of license plate 800 taken in diffuse ambient lighting. Under ambient lighting, the background graphic 810 and human-readable information 815, 817 and 819 are seen. FIG. 11B is a picture of the same license plate 800 taken under retroreflected infrared (IR) lighting. Under retroreflected IR lighting, background graphic 810 and human-readable information 815, 817 and 819 are not substantially visible and instead, machine-readable information 820 comprising embedded-markers 830, 831 becomes visible to the detector (i.e., camera).

Embedded-markers 831 were strategically disposed to create character segmentation to otherwise connected characters. In addition, embedded-markers 831 created "vertical lines" in the characters, rendering such markers useful in determining orientation and rotation of the license plate.

Figure 12:
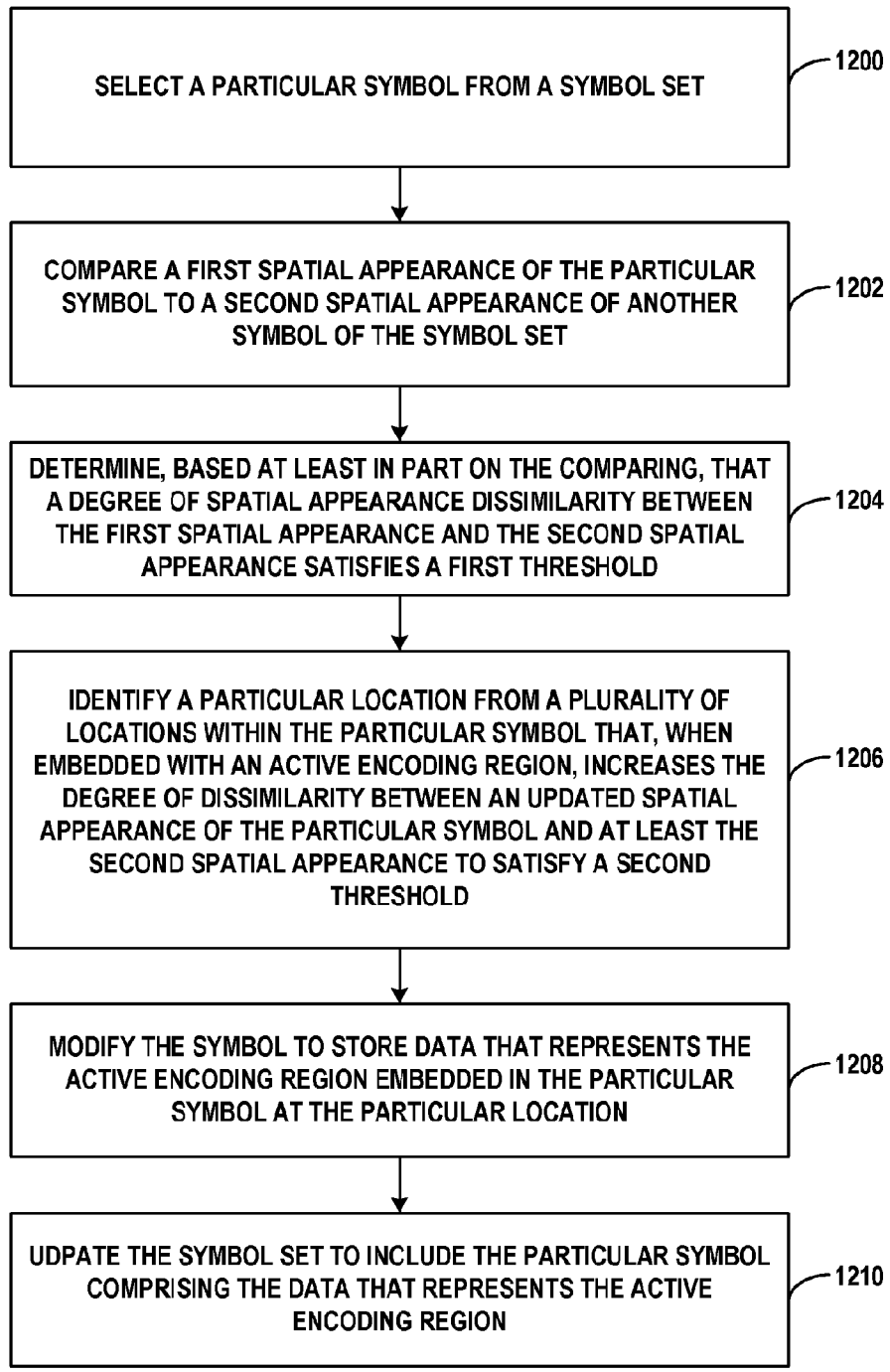
FIG. 12 is a flow diagram illustrating example operations of a computing device configured to perform techniques of this disclosure.

FIG. 12 is a flow diagram illustrating example operations of a computing device configured to perform techniques of this disclosure. For purposes of illustration only, the example operations are described below within the context of computing device 1032 of FIG. 1. Computing device 1032 may select a particular symbol from a symbol set (1200). Computing device 1032 may compare a first spatial appearance of the particular symbol to a second spatial appearance of another symbol of the symbol set, wherein the first spatial appearance and the second spatial appearance are based on a particular lighting condition (1202). Computing device 1032 may determine, based at least in part on the comparing, that a degree of dissimilarity between the first spatial appearance and the second spatial appearance satisfies a first threshold (1204). Computing device 1032 may identify a particular location from a plurality of locations within the particular symbol that, when embedded with an active encoding region, increases the degree of dissimilarity between an updated spatial appearance of the particular symbol and at least the second spatial appearance to satisfy a second threshold (1206). Computing device 1032 may modify the symbol to store data that represents the active encoding region embedded in the particular symbol at the particular location (1208). Computing device 1032 may update the symbol set to include the particular symbol comprising the data that represents the active encoding region (1210). In some examples, an IR version of an image could be used on its own rather than requiring visible information (human and/or machine readable) to determine framing and then further using IR (machine readable) to extract embedded data. In some examples, computing device 116 may only use machine readable information for OCR, and then from the OCR output (e.g., recognized symbols) derive the human readable information. In some examples, the human readable information is not needed to be identified prior to performing techniques of this disclosure.

Figure 13:
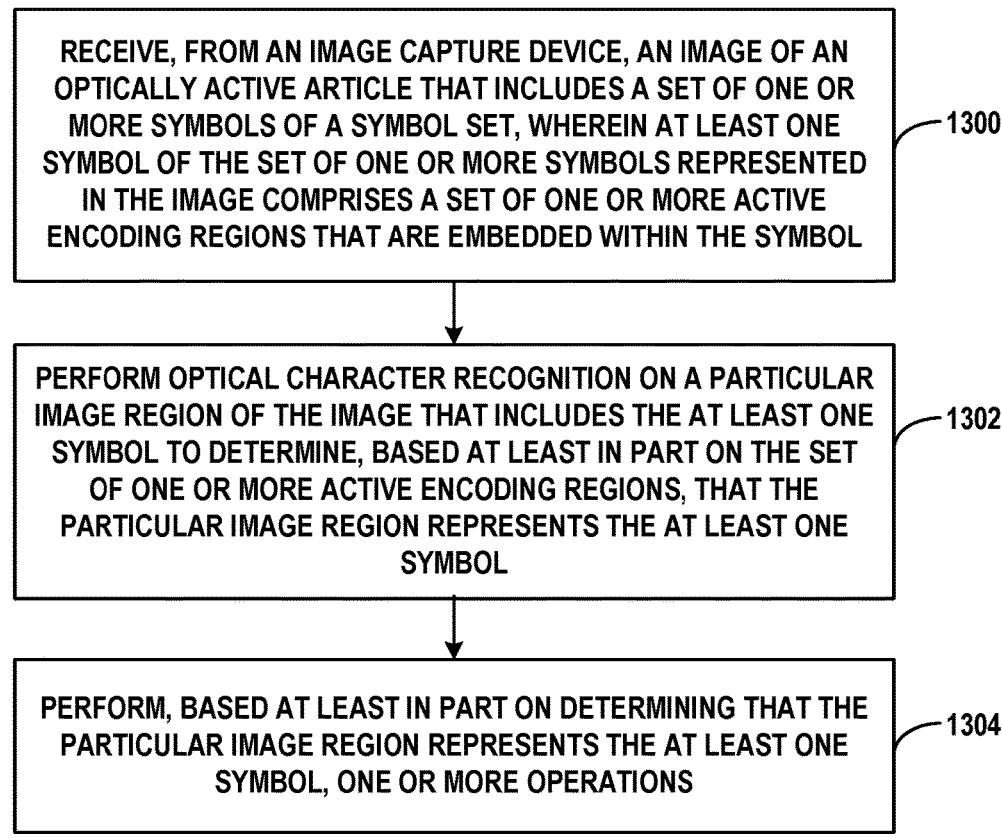
FIG. 13 is a flow diagram illustrating example operations of a computing device configured to perform techniques of this disclosure.

FIG. 13 is a flow diagram illustrating example operations of a computing device configured to perform techniques of this disclosure. For purposes of illustration only, the example operations are described below within the context of computing device 1016 of FIG. 1. Computing device 1016 may receive, from an image capture device, an image of an optically active article that includes a set of one or more symbols of a symbol set (1300). At least one symbol of the set of one or more symbols represented in the image may include a set of one or more active encoding regions that are embedded within the symbol. Computing device 1016 may perform optical character recognition on a particular image region of the image that includes the at least one symbol to determine, based at least in part on the set of one or more active encoding regions, that the particular image region represents the at least one symbol (1302). An arrangement of the set of one or more active encoding regions within the at least one symbol may provide a degree of character dissimilarity between the at least one symbol and another symbol in the symbol set that satisfies a predefined threshold. Computing device 1016 may perform, based at least in part on determining that the particular image region represents the at least one symbol, one or more operations (1304).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
receiving, by a computing device and from an image capture device, an image of an optically active article that includes a set of one or more symbols of a symbol set, wherein at least one symbol of the set of one or more symbols represented in the image comprises a set of one or more active encoding regions that are embedded within the symbol;
performing optical character recognition on a particular image region of the image that includes the at least one symbol to determine, by the computing device and based at least in part on the set of one or more active encoding regions, that the particular image region represents the at least one symbol, wherein an arrangement of the set of one or more active encoding regions within the at least one symbol provides a degree of character dissimilarity between the at least one symbol and another symbol in the symbol set that satisfies a pre-defined threshold; and
performing, by the computing device and based at least in part on determining that the particular image region represents the at least one symbol, one or more operations.

2. The method of claim 1, wherein the active encoding region of the particular symbol is printed with visibly-opaque, infrared-transparent ink and a remaining area of the particular symbol that excludes the active encoding region is printed with visibly-opaque, infrared-opaque ink.

3. The method of claim 1, wherein the active encoding region of the particular symbol is printed with visibly-opaque, infrared-opaque ink and a remaining area of the particular symbol that excludes the active encoding region is printed with visibly-opaque, infrared-transparent ink.

4. The method of claim 1,
wherein a first set of pixel values, which represent one or more active encoding regions of the one or more encoding regions, are within a first range of pixel values,
wherein a second set of pixel values, which represent a remaining portion of the at least one symbol that excludes the one or more active encoding regions, are within a second range of pixel values that are different from the first range of pixel values.

5. The method of claim 4,
wherein the image is a first image and wherein the first image of the optically active article is captured in a first spectral range within the near-infrared spectrum,
wherein a second image of the optically active article is captured in a second spectral range within the visible spectrum,
wherein a third set of pixel values that represent the at least one symbol in the second image are within the second range of pixel values, and wherein a first proportion of the third set of pixel values that represent the at least one symbol is greater than a second proportion of the second set of pixel values that represent the at least one symbol.

6. The method of claim 1, wherein the image is captured under a lighting condition within the near-infrared spectrum.

7. The method of claim 1, wherein at least one symbol represents human-readable information in a first spectral range, wherein the first spectral range includes wavelengths between 350 and 750 nm.

8. A retroreflective article comprising:
a retroreflective substrate;
a set of one or more symbols disposed on the retroreflective substrate, wherein an arrangement of a set of one or more active encoding regions at one or more pre-determined locations within the at least one symbol of the set of one or more symbols provides a degree of character dissimilarity between the at least one symbol and another symbol in the set that satisfies a pre-defined threshold based on the arrangement of the set of one or more active encoding regions at the one or more pre-determined locations.

9. The method of claim 8, wherein visibly-opaque, infrared-transparent ink is disposed at the set of one or more active encoding regions and visibly-opaque, infrared-opaque ink is disposed on a remaining area of the particular symbol that excludes the set of one or more active encoding regions.

10. The method of claim 8, wherein visibly-opaque, infrared-opaque ink is disposed at the set of one or more active encoding regions and visibly-opaque, infrared-transparent ink is disposed on a remaining area of the particular symbol that excludes the set of one or more active encoding regions.

11. A method of making an optically-active article comprising:
receiving a user input specifying information;
generating, based at least in part on the user input, a printing specification that includes a particular symbol with one or more active encoding regions, wherein the printing specification specifies a set of one or more symbols to include within an optically active article, wherein the one or more active encoding regions embedded within the particular symbol provide a degree of dissimilarity between a first spatial appearance of the particular symbol and at least a second spatial appearance of a second symbol that satisfies a pre-defined threshold based on the arrangement of the one or more active encoding regions at one or more pre-determined locations; and
constructing, based at least in part on the printing specification, the optically active article with the particular symbol.

12. The method of claim 11, wherein constructing the optically active article with the particular symbol comprises:
printing the one or more active encoding regions of the particular symbol with visibly-opaque, infrared-transparent ink and printing a remaining area of the particular symbol that excludes the one or more active encoding regions with visibly-opaque, infrared-opaque ink.

13. The method of claim 11, wherein producing the optically active article comprising:
printing the one or more active encoding regions of the particular symbol with visibly-opaque, infrared-opaque ink and printing a remaining area of the particular symbol that excludes the one or more active encoding regions with visibly-opaque, infrared-transparent ink.

14. The method of claim 11, wherein the threshold is a maximum degree of dissimilarity within a range of degrees of dissimilarity.

15. The method of claim 11, wherein the second threshold is a degree of dissimilarity that is greater than or equal to at least 80% of a maximum degree of dissimilarity within a range of degrees of dissimilarity.

16. The method of claim 11, wherein the second threshold is at least one of a hard-coded value, user-defined value, or machine-generated value.

17. The method of claim 11,
wherein a first set of pixel values, which represent the one or more active encoding regions of one or more encoding regions, are within a first range of pixel values,
wherein a second set of pixel values, which represent a remaining portion of the at least one symbol that excludes the one or more active encoding regions, are within a second range of pixel values that are different from the first range of pixel values.

* * * * *